US009596899B2

(12) United States Patent
Stahl et al.

(10) Patent No.: US 9,596,899 B2
(45) Date of Patent: Mar. 21, 2017

(54) APPARATUSES AND METHODS OF INTERACTING WITH 2D DESIGN DOCUMENTS AND 3D MODELS AND GENERATING PRODUCTION TEXTURES FOR WRAPPING ARTWORK AROUND PORTIONS OF 3D OBJECTS

(71) Applicant: GroupeSTAHL, St. Clair Shores, MI (US)

(72) Inventors: Brett Stahl, St. Clair Shores, MI (US); Clint Phillips, St. Clair Shores, MI (US); Matias Leandro Capeletto, Ciudad de Buenos Aires (AR)

(73) Assignee: GroupeSTAHL, Sterling Heights, MI (US)

( * ) Notice: Subject to any disclaimer, the term of this patent is extended or adjusted under 35 U.S.C. 154(b) by 0 days.

(21) Appl. No.: 14/733,217

(22) Filed: Jun. 8, 2015

(65) Prior Publication Data

US 2015/0351477 A1 Dec. 10, 2015

Related U.S. Application Data

(60) Provisional application No. 62/009,713, filed on Jun. 9, 2014.

(51) Int. Cl.
*G06F 19/00* (2011.01)
*A41H 3/00* (2006.01)
(Continued)

(52) U.S. Cl.
CPC ............ *A41H 3/007* (2013.01); *G06F 17/50* (2013.01); *G06T 11/001* (2013.01); *G06T 15/04* (2013.01);
(Continued)

(58) Field of Classification Search
CPC ......... A41H 3/007; G06T 19/00; G06T 19/20; G06T 15/04; G06T 2219/021; G06F 17/50; G06F 2217/32
(Continued)

(56) References Cited

U.S. PATENT DOCUMENTS

2006/0015208 A1 1/2006 Reyes Moreno
2007/0203608 A1 8/2007 Kang
(Continued)

FOREIGN PATENT DOCUMENTS

JP 2010061477 3/2010

OTHER PUBLICATIONS

PCT International Search Report dated Aug. 28, 2015 for corresponding PCT Application No. PCT/US2015/034723 filed on Jun. 8, 2015.

*Primary Examiner* — Nathan Durham
(74) *Attorney, Agent, or Firm* — Harness, Dickey & Pierce PLC

(57) ABSTRACT

A network device including document, design, aggregation and production texture modules. The document module generates a 2D design document that includes non-aggregated texture islands (NTIs). Each of the NTIs corresponds to a pattern of a product. The NTIs include at least two versions of one of the NTIs. The design module adds an artwork image across at least two of the NTIs. The aggregation module aggregates the at least two versions of the NTIs and generates a final aggregated texture image based on the 2D design document. The final aggregated texture image includes final aggregated texture islands (FATIs). Each of the FATIs is distinctive from the other ones of the FATIs. The production texture module, based on the final aggregated texture image, generates a production texture that includes islands, which are scaled to match an actual
(Continued)

size of a respective pattern to be transferred on fabric for the product.

34 Claims, 18 Drawing Sheets

(51) Int. Cl.
 *G06F 17/50* (2006.01)
 *G06T 11/00* (2006.01)
 *G06T 15/04* (2011.01)
 *G06T 19/00* (2011.01)
(52) U.S. Cl.
 CPC .......... *G06T 19/00* (2013.01); *G06F 2217/32* (2013.01); *G06T 2219/021* (2013.01)
(58) Field of Classification Search
 USPC .................................................. 700/130–133
 See application file for complete search history.

(56) References Cited

U.S. PATENT DOCUMENTS

| | | | |
|---|---|---|---|
| 2008/0183440 A1 | 7/2008 | Lind | |
| 2013/0018498 A1 | 1/2013 | Jones et al. | |
| 2015/0066189 A1* | 3/2015 | Mulligan | ............ G06F 3/04815 700/136 |
| 2015/0208746 A1* | 7/2015 | Schindler | ............... G06Q 10/06 700/132 |
| 2015/0339800 A1* | 11/2015 | Selvarajan | ............. A41H 3/007 345/419 |

* cited by examiner

APPARATUSES AND METHODS OF INTERACTING WITH 2D DESIGN DOCUMENTS AND 3D MODELS AND GENERATING PRODUCTION TEXTURES FOR WRAPPING ARTWORK AROUND PORTIONS OF 3D OBJECTS

CROSS-REFERENCE TO RELATED APPLICATIONS

This application claims the benefit of U.S. Provisional Application No. 62/009,713, filed on Jun. 9, 2014 and U.S. Provisional Application No. 62/045,933, filed on Sep. 4, 2014. The entire disclosures of the applications referenced above are incorporated herein by reference.

FIELD

The present disclosure relates to printing on clothing articles and other 3D objects.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A clothing article (e.g., a T-shirt) may be pre-constructed and mass produced to create a large number of the same clothing article. The clothing article has a standardized size with standardized patterns. The standardized patterns of a T-shirt may include, for example, a front pattern, a back pattern, sleeve patterns, and a neck (or collar) pattern. As an alternative, a clothing article may have a non-standardized size and non-standardized patterns and be individually constructed to provide a customized end result.

Artwork designs can be applied to fabric of a clothing article. The artwork designs can be applied subsequent to sewing fabric patterns together to form the clothing article (i.e. after the clothing article is manufactured). As an example, an artwork design (e.g., text and/or a 2D image) may be created on a computer. An output file of the artwork design may be transferred from the computer to a printer. The printer may print dye onto heat transfer (or sublimation) paper in a form of the artwork design. The clothing article may be flattened and the heat transfer paper may be set on the clothing article and placed in a heat press to transfer the printed artwork design onto the clothing article.

As an alternative, one or more artwork designs may be applied to fabric portions of a clothing article prior to the fabric portions being sewed together. In this example, the one or more designs are printed on a sheet of heat transfer paper such that the one or more artwork designs are in pattern areas of the heat transfer paper. The pattern areas refer to areas corresponding to patterns of the clothing article. As an example, a large sheet of heat transfer paper may have corresponding surface areas for each pattern of a clothing article. Artwork designs to be applied on portions (a front portion, a back portion, and sleeve portions) of the clothing article may be printed in areas of the sheet of heat transfer paper. The heat transfer paper is then laid on fabric and placed within a heat press. Dimensions of the fabric may be similar to dimensions of the sheet of heat transfer paper. Heat is applied to transfer the artwork design from the heat transfer paper to the fabric. The fabric is then cut to provide fabric patterns, which are then sewed together to provide the end assembled clothing article.

SUMMARY

A network device is provided and includes a document module, a design module, an aggregation module and a production texture module. The document module is configured to generate a 2D design document, where the 2D design document includes non-aggregated texture islands, where each of the non-aggregated texture islands corresponds to a pattern of a product being manufactured, and where the non-aggregated texture islands include at least two versions of one of the non-aggregated texture islands. The design module is configured to add an artwork image across at least two of the non-aggregated texture islands. The aggregation module is configured to (i) aggregate the at least two versions of the non-aggregated texture islands, and (ii) generate a final aggregated texture image based on the 2D design document, where the final aggregated texture image includes final aggregated texture islands, and where each of the final aggregated texture islands is distinctive from the other ones of the final aggregated texture islands. The production texture module is configured to generate a production texture based on the final aggregated texture image, where the production texture includes production islands, and where the production islands are scaled to match an actual size of a respective pattern to be transferred on fabric for the product.

In other features, a method is provided and includes generating a 2D design document, where the 2D design document includes non-aggregated texture islands, where each of the non-aggregated texture islands corresponds to a pattern of a product being manufactured, and where the non-aggregated texture islands include at least two versions of one of the non-aggregated texture islands. The method further includes: adding an artwork image across at least two of the non-aggregated texture islands; aggregating the at least two versions of the non-aggregated texture islands to generate a first final aggregated texture island; and generating a final aggregated texture image based on the 2D design document, where the final aggregated texture image includes final aggregated texture islands, where the final aggregated texture islands include the first final aggregated texture island, and where each of the final aggregated texture islands is distinctive from the other ones of the final aggregated texture islands. The method further includes generating a production texture based on the final aggregated texture image, where the production texture includes production islands, and where the production islands are scaled to match an actual size of a respective pattern to be transferred on fabric for the product.

In other features, a method is provided and includes: receiving a 2D point referring to a current position of a pointer in a 3D window, where a 3D model is viewable in the 3D window; converting the 2D point to a 3D point via ray casting; determining whether an intersection exists for the 3D point with a face on the 3D model; based on whether the intersection exists, inverse island transforming the 3D point to obtain a vertex in UV map coordinates; and determining whether the vertex is in an initial texture island of a 2D design document. The method further includes: calculating an extended position based on at least two of (i) a last position of the pointer corresponding to a point on the initial texture island, (ii) an initial position of the pointer; and (iii)

the current position of the pointer; altering the initial texture island if the vertex is in the initial texture island; and altering a second texture island based on the extended position if the vertex is not in the initial texture island.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
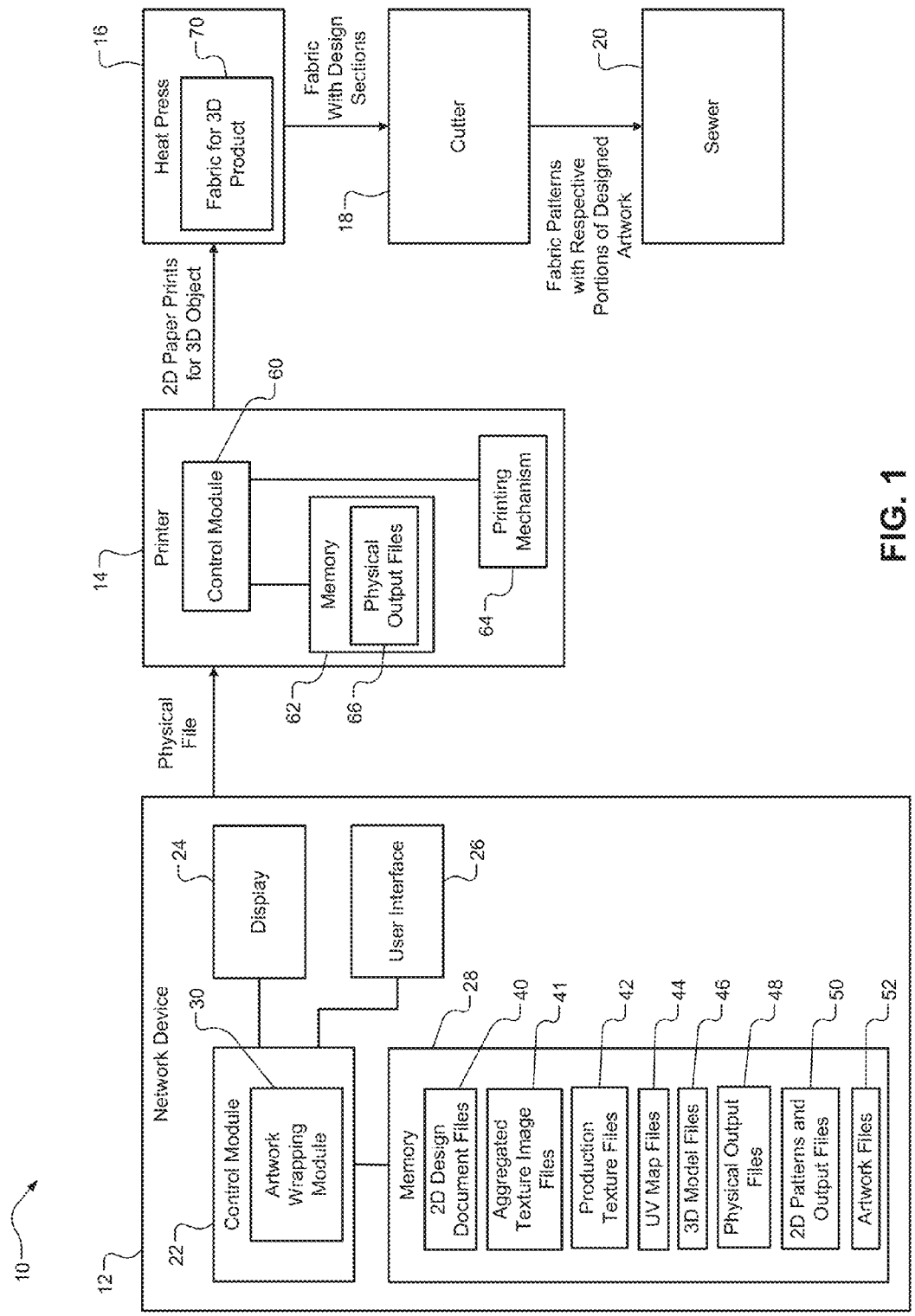
FIG. 1 is a view of a functional block diagram of a design and manufacturing system incorporating a control module having an artwork wrapping module in accordance with the present disclosure.

Artwork designs may be applied to fabric of clothing articles prior to or subsequent to the cutting and/or sewing of fabric patterns (or panels) of the clothing article. Traditional techniques for creating and applying artwork designs to fabric have associated limitations and disadvantages. For example, by flattening and applying an artwork design to a clothing article subsequent to sewing together fabric patterns of the clothing article can result in the artwork design not wrapping around portions (e.g., sides, sleeves, and neck of a shirt) of the clothing article properly. This is essentially because a 2D image is applied on flattened fabric that when worn is in a 3D shape. The image can look deformed in certain areas and/or may not be applied in certain areas of the shirt (e.g., under the sleeves and/or in armpit areas of the shirt).

As another example, an artwork design can be distorted when the artwork design is applied to fabric of a clothing article prior to the fabric being cut to provide fabric patterns. Portions of the artwork design may be in hem, seam and/or safety areas and when the fabric patterns are sewn together portions of the artwork design may not be visible near seams of the clothing article. In addition, due to manufacturing errors in aligning and sewing the fabric patterns, portions of the artwork design can be out of alignment in one or more directions. To a viewer, portions of the artwork can look cut off, disjointed, and/or simply do not provide a continuous wrap around and/or crossover look between adjacent patterns (or panels) of a clothing article. Example systems and methods are disclosed below for providing continuous wrapping and/or crossover of artwork across boundaries of adjacent patterns (or panels) of a clothing article (e.g., a T-shirt) without dislocated portions, missing portions, distorted portions, and/or other irregularities in the artwork. The ability to continuously wrap artwork allows a user to wrap artwork on a shirt, for example: from front to back; from a left side to a right side; around a collar; over a shoulder; under an armpit area; etc.

As used herein, the term "pattern" may refer to a software representation of a panel or portion of a clothing article that has one or more edge areas (e.g., hem areas and/or safety areas), which are to be sewn, adhered and/or otherwise attached to one or more corresponding edge areas of one or more other panels. A garment may be divided into and as a result formed from a set of different patterns. A hem area refers to an area that is to be folded under and, for example, sewn to a panel, such as (i) a bottom portion of a shirt, or (ii) ends of sleeves or pant legs. A safety area refers to an area of a first panel, which is to be tucked in along, for example, a seam line and/or sewn to another tucked in safety area of a second panel. Hem areas and safety areas may be between seam lines and outer edges of the patterns and/or panels.

A software representation of a panel and/or image of a panel may be, for example a two-dimensional (2D) texture pattern, a production pattern, or a UV pattern. The term pattern may also refer to physical panels (or objects) that are to be used and/or combined to create a clothing article. A panel may refer to, for example, a front portion, a back portion, a sleeve, a collar, and/or other portion of a clothing article. A pattern may also refer to a heat transfer paper pattern (or paper pattern) or a fabric pattern. A pattern may include seam lines, hem areas, and/or safety areas. Examples of at least some of these types of patterns are shown in FIGS. 3-12. These different types of patterns are further described below.

Also, as used herein, the term "texture" may refer to one or more texture islands, final aggregated texture islands, production islands, a collection of texture islands, a collection of final aggregated texture island, and/or a collection of production islands. The term "texture" is equivalent to the term "2D texture". A final aggregated texture image may refer to a texture image showing a 2D representation of a 3D model including any applied artwork and is further defined below. The 2D representation of the 3D model may be in a shape of a UV map. A texture island refers to a vector outline of a region included in a 2D design document and has a corresponding representation in a UV space. The representation in the UV space is a UV map, which is further defined below. A texture island is transformed to a final aggregated texture image that ends up being wrapped to at least some portion of a 3D model (or 3D polygonal structure). A texture image refers to a certain type of 2D image, such as: an image of one or more texture islands; an image of a production texture; and/or a final aggregated texture island, which is further defined below. A texture island is a region provided as a result of tracing a UV map. A texture island may refer to a single 2D software representation of a single panel or portion of a clothing article or other item to be manufactured. A texture island includes an outline corresponding to an outline of the panel and may include a seam line, which may be used as a reference for clipping artwork during design of a clothing article. The outlines may also be used as a reference for where fabric of a clothing article is to be cut during manufacturing. A texture island may refer to, for example, a front portion, a back portion, a sleeve, a collar, or other portion of a shirt. A texture island is representative of a pattern to be cutout of fabric and then sewn, adhered and/or otherwise attached to one or more other fabric patterns. Texture islands are typically not scaled to actual sizes of corresponding patterns of a 3D object being manufactured. Examples of a texture are a 2D design texture and a production texture.

A 2D design texture may refer to a collection of texture islands included in a 2D design document. A production texture may refer to a collection of texture islands (referred to as production islands) included in a production document. A production texture may include scaled and/or aggregated versions of texture islands in a 2D design document. A production texture is a single texture build of all of the pages of a 2D design document, as further described below.

A 2D design texture may refer to one or more texture islands and/or one or more arrangements of texture islands. A 2D design texture may include, as further described below, multiple texture island versions for the same panel or portion of the item being manufactured. For example, a 2D design texture may include multiple front panels of a shirt. Each of the front panels may have different artwork, the same artwork, and/or portions of the same artwork. The number of front panels in the 2D design texture and the corresponding conversion of the front panels to a front panel of a production texture provide different effects in a corresponding 3D model and a finished manufactured product. This is described in more detail below. The 2D design texture may refer to the 2D design document and does not refer to a production texture.

FIG. 1 shows a design and manufacturing system 10 that includes a network device 12, a printer 14, a heat press 16, a cutter 18, and a sewer 20. The network device 12 may be a computer, a server, a mobile device, a cellular phone, a personal data assistant, a wearable device, or other suitable device. The network device 12 may include a control module 22, a display 24, a user interface 26 and a memory 28. The control module 22 includes an artwork wrapping module 30, which provide for continuous wrapping and/or crossover between adjacent patterns (or panels) of a clothing article (e.g., hats, pants, shirts, gloves, shoes, skirts, dresses, etc.) and/or item being manufactured.

The control module 22 and/or artwork wrapping module 30 may display pages of a 2D design document, texture islands, final aggregated texture images, production textures, UV maps, and/or 3D models on the display 24. A user may via the user interface 26 and/or the display 24: alter texture islands and/or a 3D model; add texture islands to a 2D design document; and/or add artwork to texture islands and/or 3D models. The display 24 may be a touch screen. The user interface 26 may include a keyboard, a mouse, a touch screen, a keypad, and/or other user interface. In one embodiment, UV maps, pages of a 2D design document, texture islands, final aggregated texture images, and/or production textures are not displayed. In another embodiment, UV maps, pages of a 2D design document, texture islands, final aggregated texture images, and production textures are not displayed and the user simply interacts with a view of a 3D model. A UV map refers to a collection of one or more UV patterns (or UV islands). A UV map is not equivalent to a texture. A UV map may refer to a collection of one or more UV patterns (or UV islands). A UV map may refer to 2D mesh representation of mapping performed from a 2D representation (e.g., a 2D design document or production texture) of 3D object to a 3D model (or a 3D mesh representation of a 3D model). This mapping may include generation of a final aggregated texture image. A final aggregated texture image may refer to an image showing a single 2D image representation of a complete 3D model including any artwork applied to corresponding texture islands of a 2D design document and/or applied to the 3D model. A final aggregated texture image is in a shape of a UV map, which may be a UV map of the entire 3D model including the applied artwork. Data associated with the mapping performed may be stored as metadata for each vertex of a 3D polygonal representation (each point in the 3D mesh has a set of UV coordinates). A final aggregated texture image may be created from a 2D design document and may be generated during a transformation from a 2D space to a 3D space.

Although not displayed, the UV maps, the pages of the 2D design document, the texture islands, the final aggregated texture images, and/or the production textures may be generated, hidden, stored, and/or altered while altering the corresponding 3D model. Independent of whether the UV maps, pages of the 2D design document, the texture islands, the final aggregated texture images, and/or the production textures are displayed, the 3D model, the UV maps, the pages of the 2D design document, the texture islands, the final aggregated texture images, and/or the production textures may be updated at a predetermined rate (e.g., 30 times per second). The predetermined rate is set such that the updates appear to occur in real time to a user.

The memory 28 may store 2D design document files 40, aggregated texture image files 41, UV map files 42, production texture files 44, 3D model files 46, physical output files 48, 2D patterns and outline files 50 and artwork files 52. In the following disclosure various 2D design documents, UV maps, final aggregated texture images, production textures, 2D models, etc. are disclosed and described. Corresponding files are generated, accessed, and/or modified via corresponding modules when the 2D design documents, UV maps, final aggregated texture images, production textures, 2D models, etc. are generated, accessed and/or modified.

The 2D design document files 40 include 2D design documents, which each include one or more pages of 2D design arrangements. Each page may include one or more 2D design arrangements. Each 2D design arrangement may include any number of texture islands that are placed in a particular configuration relative to each other. Each texture island includes a collection of vector data and/or curves that collectively provide a 2D image. Each texture island may simply provide an outline of a pattern. Each texture island may identify a viewable area within the corresponding outline.

A viewable area refers to an outwardly viewable area that is viewable upon manufacturing completion of a garment or other manufacturable item. An outline of a viewable area of a texture island (or pattern) may follow and remain a predetermined distance away from an outer edge (or perimeter) of the texture island (or pattern). The predetermined distance may vary in width along the perimeter of the texture island (or pattern). A viewable area typically does not include an area of a pattern that is tucked under and/or sewn within a clothing article. A viewable area also does not typically refer to an area inside a manufacturable item. A viewable area is different than a printable area. A whole surface area of a pattern may be printed on and thus the whole surface area of the pattern is printable. This is unlike a viewable area, which does not refer to a whole outwardly facing surface area of a pattern, as some of the outwardly facing surface area (e.g., a hem area or a safety area) is not viewable once attached to another pattern. Examples of viewable areas are shown in FIGS. 3-5 and 7-12.

A 2D design document may refer to a document having one or more pages. Each page of a 2D design document may have multiple layers and corresponds to a view of one or more 2D design arrangements. Each view may have two corresponding layers. The first (or island) layer is the corresponding 2D design arrangement of one or more texture islands. Each first layer of each page may include one or more arrangements of texture islands. The second (or design) layer is a layer in which artwork is provided. The second layer is disposed over the first layer. The island layer exposes a given arrangement of texture islands, which allows for wrapping of artwork (e.g., 2D designs) in particular directions across a 3D model. The texture islands may be moved freely by a user while designing a product. A user may place artwork (e.g., figures or images) in design layers using the texture islands to guide the placement of the artwork in the 3D model.

Each texture island in a 2D design document may be a transformed version of a UV map in a UV space of a product being manufactured. A texture island may be generated based on a transformation performed using a UV map. The texture island may be translated and/or rotated when placed in a 2D design arrangement. An arrangement of texture islands may refer to a set of transformed texture islands that allow artwork to be wrapped in particular portions of a 3D model. The texture island may include applied artwork. The UV map files 42 may each include one or more UV maps corresponding to one or more texture islands in a corresponding 2D design document. Each of the UV maps includes a collection of vector data and/or polygons that may be used to collectively provide a 2D image. Each of the UV maps may correspond to a 2D arrangement of texture islands or a portion thereof.

The production texture files 44 may each include, to scale, patterns of a clothing article or other item to be manufactured. Each of the production texture files 44 may be associated with a single clothing article or other item of manufacturing and include a single pattern for each separate portion of the clothing article or other item to be manufactured. The separate portions are attached to each other during manufacturing. Each pattern is sized and includes all corresponding artwork, which is to be printed on heat transfer paper for that pattern. The aggregated texture image files 41 and the production texture files 44 include aggregated and rasterized data that may be in the form of bitmap images. Vector data for texture islands associated with a single production texture island (or pattern) may be aggregated to generate final aggregated texture image data, which may then be scaled and/or modified to provide the bitmap data in the production texture files 44. The production texture files 44 include in addition to bitmap data include vector data for printing. The aggregation of the vector data for the aggregated texture image files 41 may not include summing of the vector data, but rather selecting vector data with a highest z-order. A final aggregated texture island and/or a production texture island may, based on a z-order of artwork in texture islands of a 2D design document, show and/or include data from one or more of the texture islands of the 2D design document and/or exclude data from one or more of the texture islands of the 2D design document. Points and/or triangles in the texture islands of the 2D design document with the highest z-order are mapped to points and/or triangles in a final aggregated texture image and/or a production texture. A production texture may be referred to as a production color map.

The 3D model files 46 may each include data for a 3D model. The data may include data generated when converting texture islands, UV maps, a final aggregated texture image, and/or a production texture to a 3D model. The data for a 3D model may include data generated when converting vector data of 2D patterns received for a clothing article and used to generate an initial version, without added artwork, of the 3D model. The data for a 3D model may include data generated by a 3D simulator and/or a 3D clothing simulator. An example of a 3D simulator is Marvelous Designer®.

The physical output files 48 refer to files transmitted from the network device 12 to the printer 14. The physical output files 48 are generated based on respective ones of the production texture files 44. The physical output files 48 may be .pdf type files or other suitable output files recognizable to the printer 14. The physical output files 48 include the production texture islands and/or corresponding data included in the production texture files 44.

The 2D patterns and outline files 50 may refer to files initially received containing rough 2D patterns of a clothing article or other item to be manufactured. These initial patterns do not include artwork to be applied to fabric of the item to be manufactured, but may include dimensions and/or outlines of the 2D patterns.

The artwork files 52 may include text, images, pictures, artist renderings, etc. The artwork files 52 include data for artwork to be added to texture islands and/or a 3D model. The artwork files 52 may be specific to texture islands or to 3D models. The artwork files may be specific to certain texture islands and/or certain portions of 3D models.

The memory 28 and/or portions of the memory 28 may be located separate from the network device 12 and accessed by the network device 12. This access may be wired or wireless access via one or more networks. This access may be performed at least partially over an Internet, a local area network, and/or a wide area network.

The printer 14 may include a control module 60, a memory 62 and a printing mechanism 64. The control module 60 may receive physical output files 66 from the network device 12 and store the physical output files 66 in the memory 62. The control module 60 may print ink on heat transfer paper via the printing mechanism 64 based on one or more of the physical output files 66. The heat press 16 receives printed paper for a 3D object (e.g., clothing article or other item to be manufactured) from the printer 14. The heat press applies heat to the printed paper and corresponding fabric 70 to perform a sublimation process thereby transferring the artwork on the printed paper to the fabric 70. The cutter 18 may cut out patterns out of the fabric, which are then attached to each other via, for example, the sewer 20 or other attachment device. Each of the fabric patterns has respective portions of the designed artwork.

Figure 2:
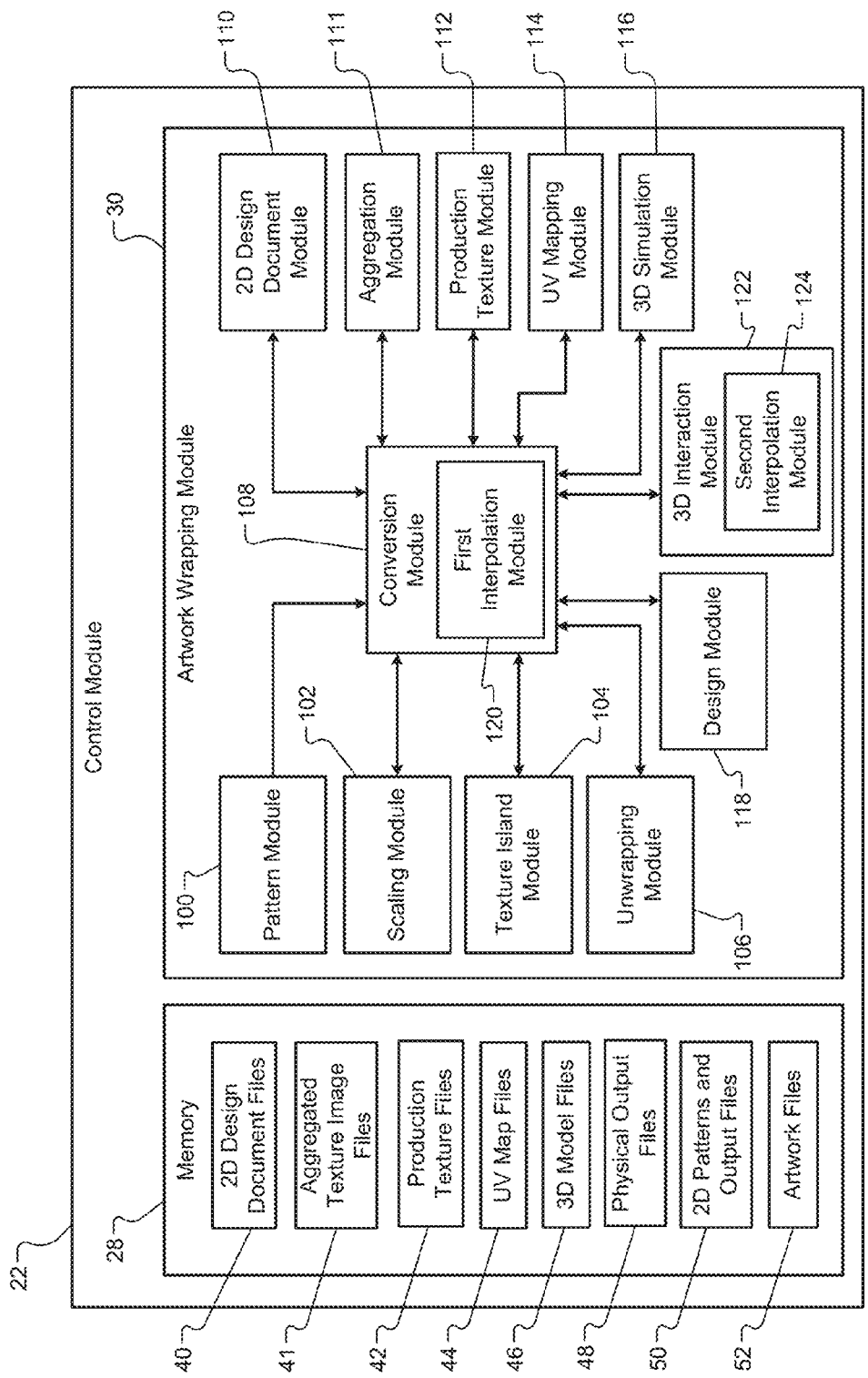
FIG. 2 is a view of a functional block diagram of the control module of FIG. 1.

FIG. 2 shows the control module 22 of the network device 12 of FIG. 1. The control module 22 includes the artwork wrapping module 30 and the memory 28. The artwork wrapping module 30 may include a pattern module 100, a scaling module 102, a texture island module 104, an unwrapping module 106, a conversion module 108, a 2D design document module 110, an aggregation module 111, a production texture module 112, a UV mapping module 114, a 3D simulation module 116, and a design module 118. The pattern module 100 receives initial 2D patterns for manufactured items. The 2D patterns may not include any artwork and may include outlines of the 2D patterns.

The scaling module 102 may scale patterns, artwork and/or data associated with one or more texture islands for generation of one or more UV maps and/or one or more production texture islands. Artwork associated with the same panel of an item being manufactured may have the same scaling or different scaling, which may be controlled based on user inputs via the user interface 26 of FIG. 1.

The texture island module 104 may generate, store, access and/or modify texture islands for 2D design documents. The unwrapping module 106 may control unwrapping of a 3D model based on a user input via the user interface 26 of FIG. 1. For example, the user may via a pointer (e.g., a point of a mouse) click on an area of a 3D model displayed on the display 24. Based on the area clicked on, the unwrapping module 106 may unwrap the 3D model in particular manner to minimize distortion and/or skewing effects to the area of interest. This may provide a particular UV map and/or a 2D document page having a particular arrangement of texture islands. The UV map and/or the page may be stored as files in the memory 28. The user may then add artwork to the texture islands in the page.

The conversion module 108 may perform various transformations, inverse transformations, and/or mappings. As a first example, the conversion module 108 may convert a 2D document and/or one or more 2D texture island arrangements with artwork to a production texture, one or more UV maps, a final aggregated texture image, and/or an updated 3D model. As another example, the conversion module 108 may transform a production texture with artwork to a UV map, a final aggregated texture image, and/or an updated 3D model. As yet another example, the conversion module 108 may inverse transform a 3D model to a UV map, a final aggregated texture image, a production texture, and/or one or more 2D texture island arrangements. The transformations and/or inverse transformations may include interpolation, which may be performed by an interpolation module 120.

The 2D design document module 110 may generate, organize, store, access, and/or modify 2D design documents. This may be based on user inputs. The 2D design document module may store a z-order of texture islands per arrangement, a z-order of arrangements per page, and a z-order of pages per 2D design document. The artwork on a texture island with the highest z-order is displayed on top of any other artwork placed in a same area of a same panel and having a lower z-order. The z-orders of the texture islands, arrangements, and pages (collectively referred to as the overall z-order) indicate the layered order of artwork on panels of a manufacturable item. Portions of a first artwork image may not be shown if overlapped by a second artwork image having a higher overall z-order. Conversions to and from 2D design documents and/or texture islands may be performed by the conversion module 108, the 2D design document module 110, and/or the aggregation module 111.

Figure 3:
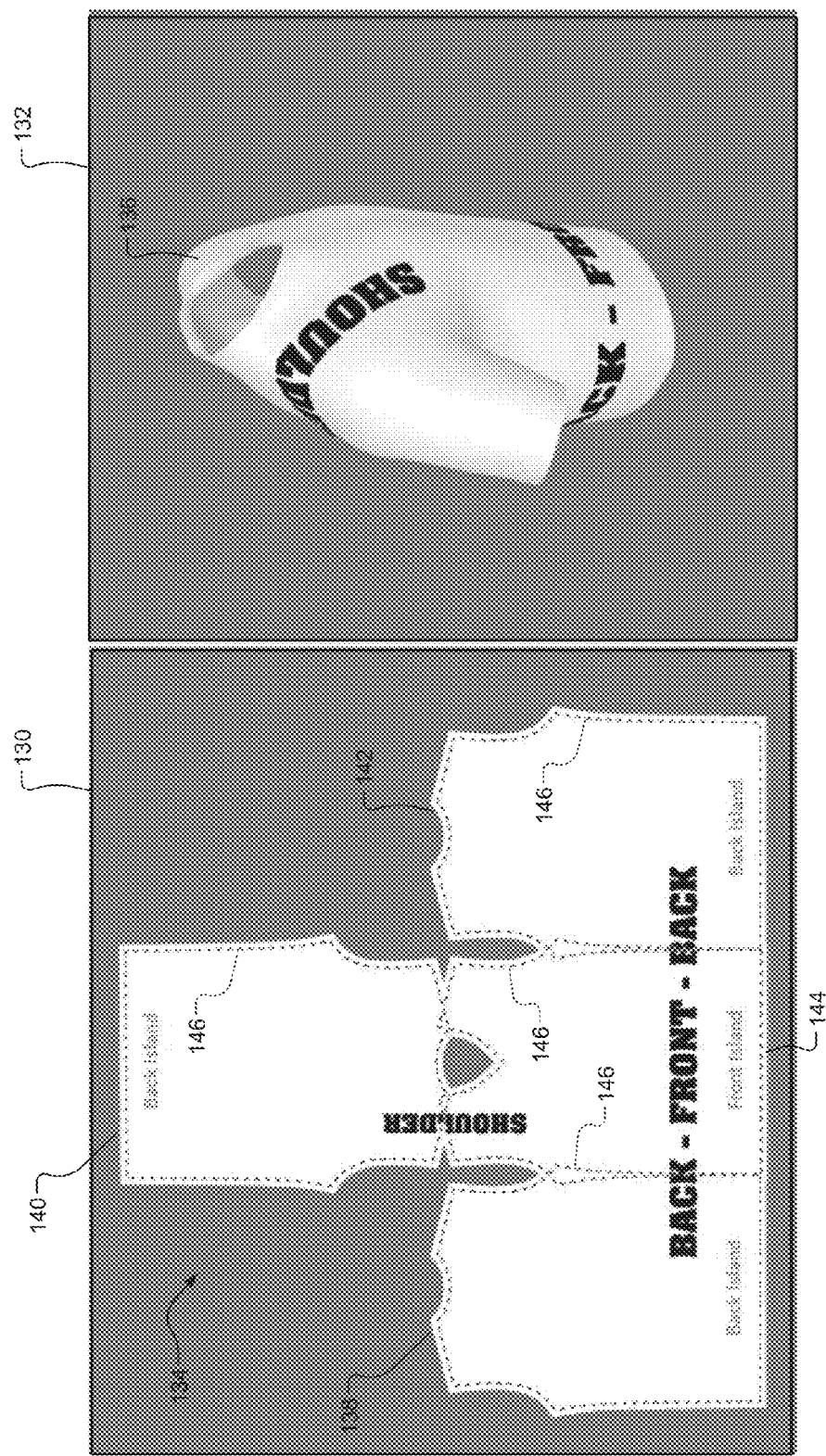
FIG. 3 is a view of a 2D document window and a corresponding 3D model window illustrating a 2D texture island arrangement and a corresponding 3D model in accordance with the present disclosure.

The aggregation module 111 performs a final aggregated texture image generation process to generate final aggregated texture images based on texture islands in 2D design documents. The final aggregated texture image generation process may refer to the process by which pages of a 2D design document with one or more arrangements of one or more transformed texture islands, which are used to generate a final aggregated texture image. The final aggregated texture image is a bitmap image with associated bitmap data stored in an aggregated texture image file. The final aggregated texture image includes aggregated islands, where each island is an aggregation of versions of the same transformed texture island including any corresponding artwork. The transformed texture islands may refer to islands that are translated and/or rotated copies of initial texture islands. The initial texture islands refer to an initial set of texture islands that are generated based on an initial 3D model generated from an initial set of patterns for a 3D object being manufactured. The initial texture islands may have been generated based on traces of outlines of UV maps in the UV space. For example, an arrangement in a 2D design document may include a copy of an initial front texture island and an initial back texture island. The initial back texture island may be rotated 180° and placed above the initial front texture islands, as shown in FIG. 3. This is further described below.

The transformed texture islands may include the initial texture islands. For each page of the 2D design document and each transformed texture island, an artwork image/figure in a corresponding design layer that overlaps with the corresponding transformed texture island is transformed by an inverse texture island transformation and may be clipped based on a corresponding outline of the transformed texture island (or an offset version of the outline). This process may include aggregation of artwork from two or more versions of the same transformed texture island from the 2D design document. Conversions to and from final aggregated texture images may be performed by the conversion module 108 or the aggregation module 111.

Figure 5:
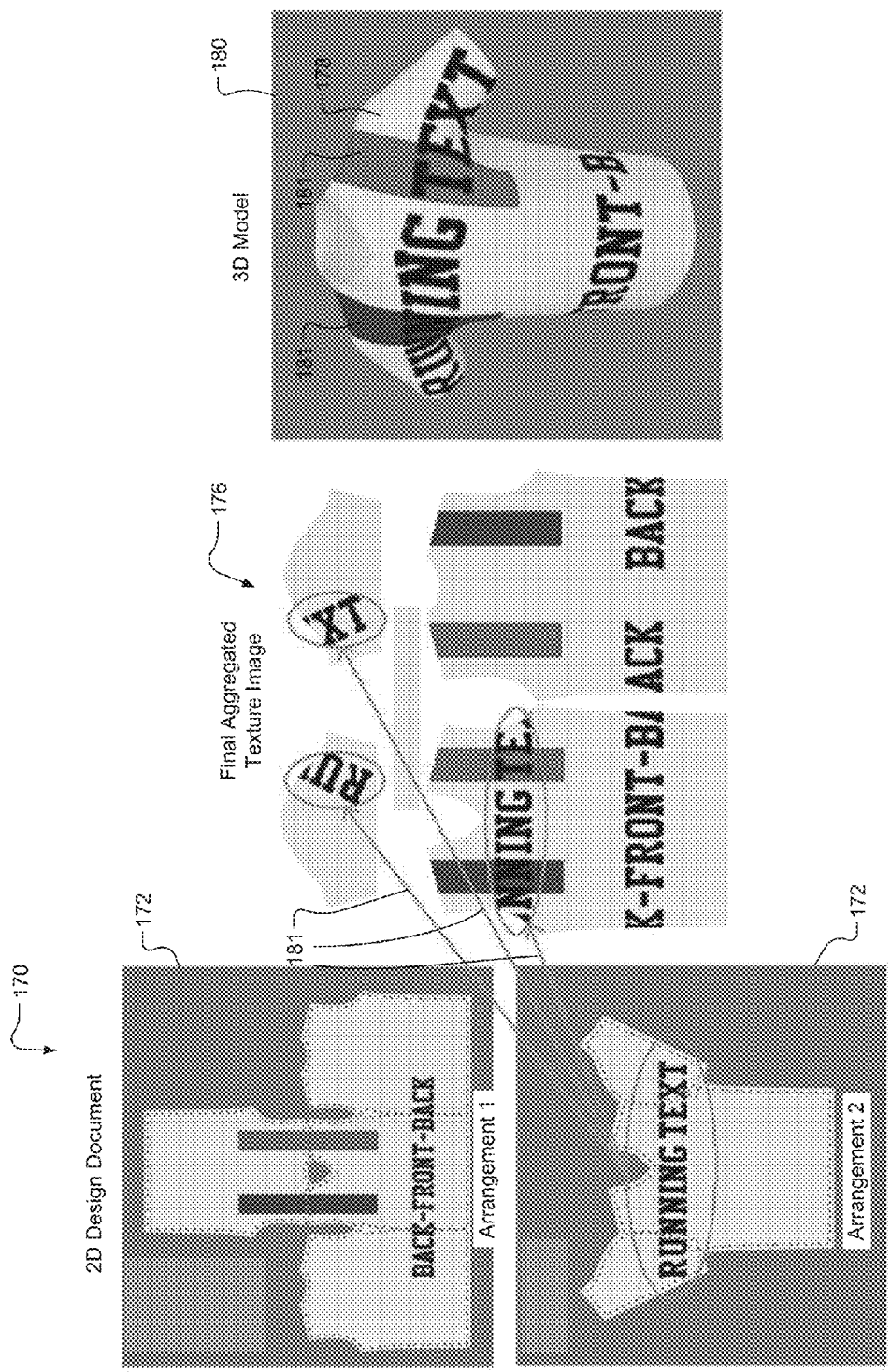
FIG. 5 is a multi-stage view of pages of a 2D design document, a final aggregated texture image, and a 3D model in accordance with the present disclosure.
Figure 7:
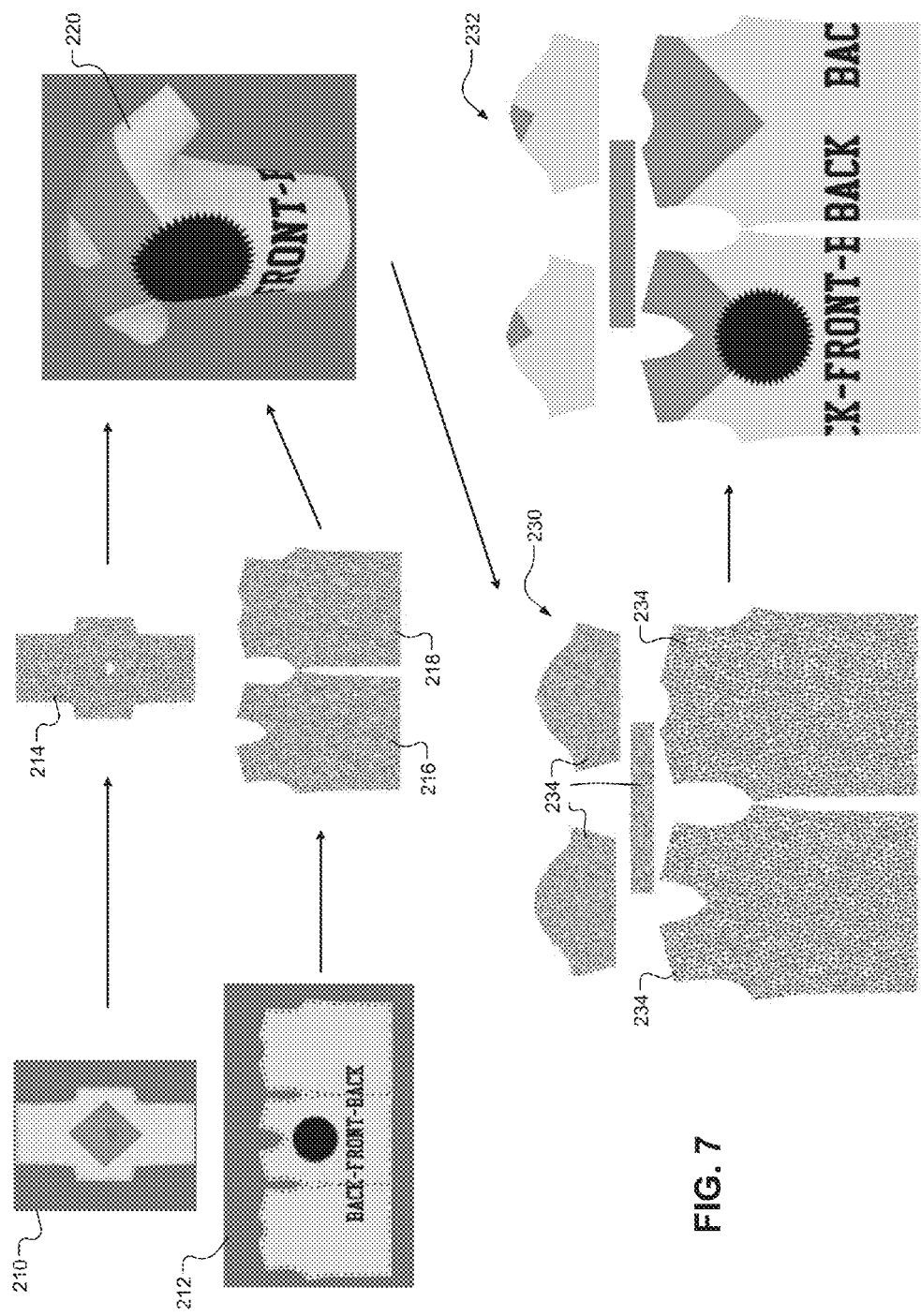
FIG. 7 is a multi-stage view illustrating multi-texture island arrangements and multi-UV map conversions to a single final aggregated texture image and a single UV map in accordance with the present disclosure.
Figure 19:
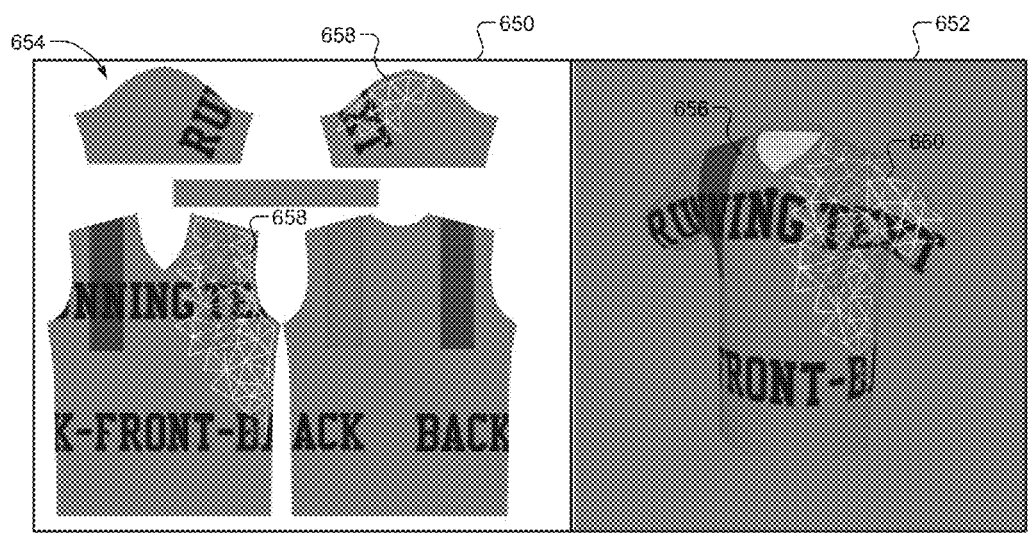
FIG. 19 is a view of windows showing a final aggregated texture image and a corresponding 3D model in accordance with the present disclosure.

The aggregation module 111 may generate a final aggregated texture image to be a texture used to display a 3D model. A size of the final aggregated texture image and/or 3D model is set that allows a user to see a result in an appropriate resolution. The resolution may be, for example, 1024×1024 pixels. The final aggregated texture image may not be scaled for printing. A 3D non-pixelated view of the 3D model may be displayed for the user based on the final aggregated texture image. An example of a final aggregated texture image is shown in FIGS. 5, 7 and 19.

The production texture module 112 may generate, store access and/or modify production textures based on respective final aggregated texture images. The production texture includes production islands respectively for the aggregated islands of the final aggregated texture image. The production texture is stored in a production texture file and in addition to bitmap data includes vector data for a printer. The production islands are properly scaled for printing. This may include sizing the production islands to match sizes of patterns to be printed on heat transfer paper and/or sizes of patterns to be cut out of fabric. Conversions to and from production textures may be performed by the conversion module 108 or the production texture module 112.

The UV mapping module 114 may generate, store access and/or modify UV maps using UV mapping algorithms. The UV mapping module 114 may clean up originally received and/or generated UV maps. The originally received UV maps may be generated based on initially received 2D patterns of a manufacturable item. The cleanup may include correcting imperfections of a UV map. For example, the cleanup may include interpolating between points to add missing triangles and/or lines of a UV map. The cleanup may also include altering the UV map to cleanup a corresponding 3D model. The cleanup may include altering the UV map to provide improved esthetics to the 3D model, such as adding wrinkles in a 3D model of a shirt for a more realistic view of the 3D model of the shirt. The UV mapping module 114 may also trace UV maps to create outlines from which the conversion module 108 and/or the 2D design document module 110 can generate texture islands. Conversions to and from production textures may be performed by the conversion module 108 or the production texture module 112.

The 3D simulation module 116 generates, stores, accesses and/or modifies 3D models. This may be based on user inputs. The 3D simulation module 116 may generate a 3D model based on one or more texture islands, one or more UV maps, a final aggregated texture image, and/or a production texture. The 3D simulation module 116 may include 3D simulation software for generating a 3D model from one or more UV maps. The 3D simulation module 116 may include a 3D interaction module 122, which controls interactions between a 3D model and corresponding texture islands of a 2D design document, UV maps, a final aggregated texture image, and a production texture. The 3D interaction module 122 may include a second interpolation module 124, which may perform interpolation described below as being performed by the 3D interaction module 122.

The design module 118 may generate, store, access and/or modify artwork images to be placed on: texture islands of 2D documents; production texture islands; UV maps; final aggregated texture islands; and/or 3d models. The texture islands of a 2D design document may be referred to as non-aggregated texture islands, since each of the texture islands of a 2D design document are not formed by aggregation of two or more texture islands. The design module may generate, store, access and/or modify artwork images based on user inputs.

The memory 28 may store the 2D design document files 40, aggregated texture image files 41, UV map files 42, production texture files 44, 3D model files 46, physical output files 48, 2D patterns and outline files 50 and artwork files 52. The files 40, 41, 42, 44, 46, 48, 50 and 52 may be accessible to the modules 100, 102, 104, 106, 108, 110, 112, 114, 116 and 118. Operations of the modules 100, 102, 104, 106, 108, 110, 111, 112, 114, 116, 118 and 120 are further described below.

Design software associated with the above-described modules 30, 100, 102, 104, 106, 108, 110, 111, 112, 114, 116, 118 and 120 allows a user to create designs in a 2D coordinate space that are converted in real time to a final aggregated texture image, which is used to render a 3D model. The design software also allows for the final aggregated texture images to be converted to production textures for manufacturing of 3D objects. The design software also allows for creating designs in a 3D coordinate space, which is converted to a 2D coordinate space to provide a production texture. The 3D model generated in the 3D coordinate space may be converted to a 2D design document.

Referring now also to FIG. 3, which shows a 2D document window 130 and a corresponding 3D model window 132 illustrating a 2D texture island arrangement 134 and a corresponding 3D model 136. The 2D texture island arrangement 134, as shown, includes three back texture islands 138, 140, 142 and a single front texture island 144. The 3D model window 132 shows a 3D model view of the 3D model 136. The 3D model is a polygonal structure rendering a final product to be manufactured. The 3D model may be continuously updated based on the 2D texture island arrangement 134 and corresponding artwork applied to the 2D texture island arrangement 134.

Certain texture islands without artwork can be repeated (i.e. multiple versions of the same texture island are provided). The artwork is then applied to the texture islands. In the example shown, the multiple back texture islands 138, 140, 142 allow for continuous wrapping of an artwork image (e.g., text) around sides of the 3D model 136 of a shirt and over a shoulder of the shirt, as shown. This is illustrated in the 3D model 136. The text "BACK-FRONT-BACK" wrap around a right side of the shirt. The text "SHOULDER" wraps or extends over a right shoulder area of the shirt. The wrappings shown are over seam lines and extend across multiple texture islands. By having multiple texture islands for the same panel, an artwork image and/or a final aggregated texture image may continuously may be wrapped 360° around the shirt while accounting for seams to provide a whole and continuous view of the artwork on the shirt. This view is provided without distortion of the artwork and/or disjointed steps between portions of the artwork. Positions of the artwork images may be adjusted by touching on, via for example a mouse pointer, the artwork images in the windows 130, 132 and dragging and/or rotating the artwork images. By clicking on and moving one of the artwork images in one of the windows 130, 132, the corresponding artwork image in the other one of the windows 130, 132 moves accordingly. This may done via the 3D interaction module 122.

Figure 8:
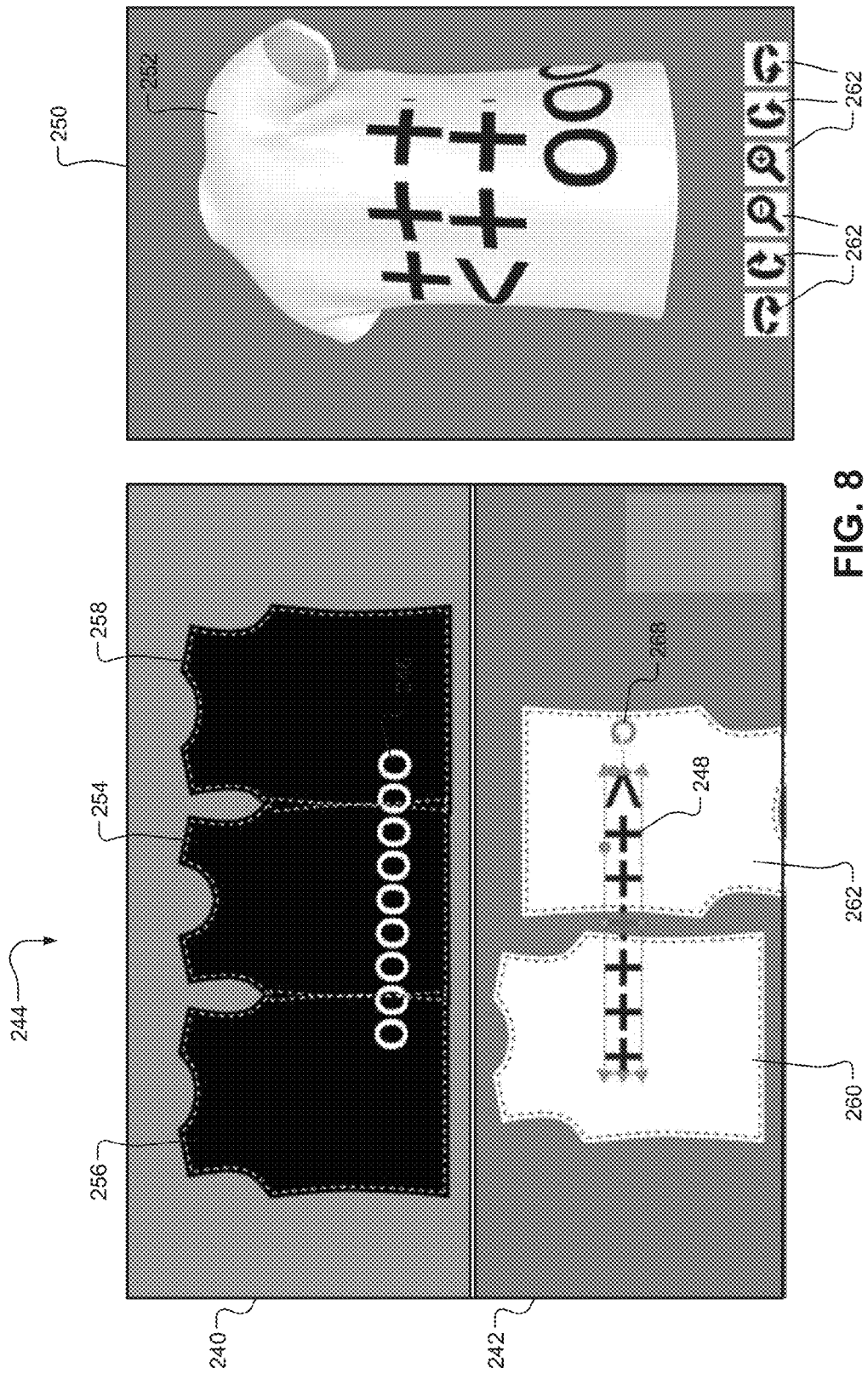
FIG. 8 is a view of pages of a 2D design document and a corresponding 3D model illustrating continuous wrapping and disjointing of artwork images on the 3D model in accordance with the present disclosure.
Figure 9:
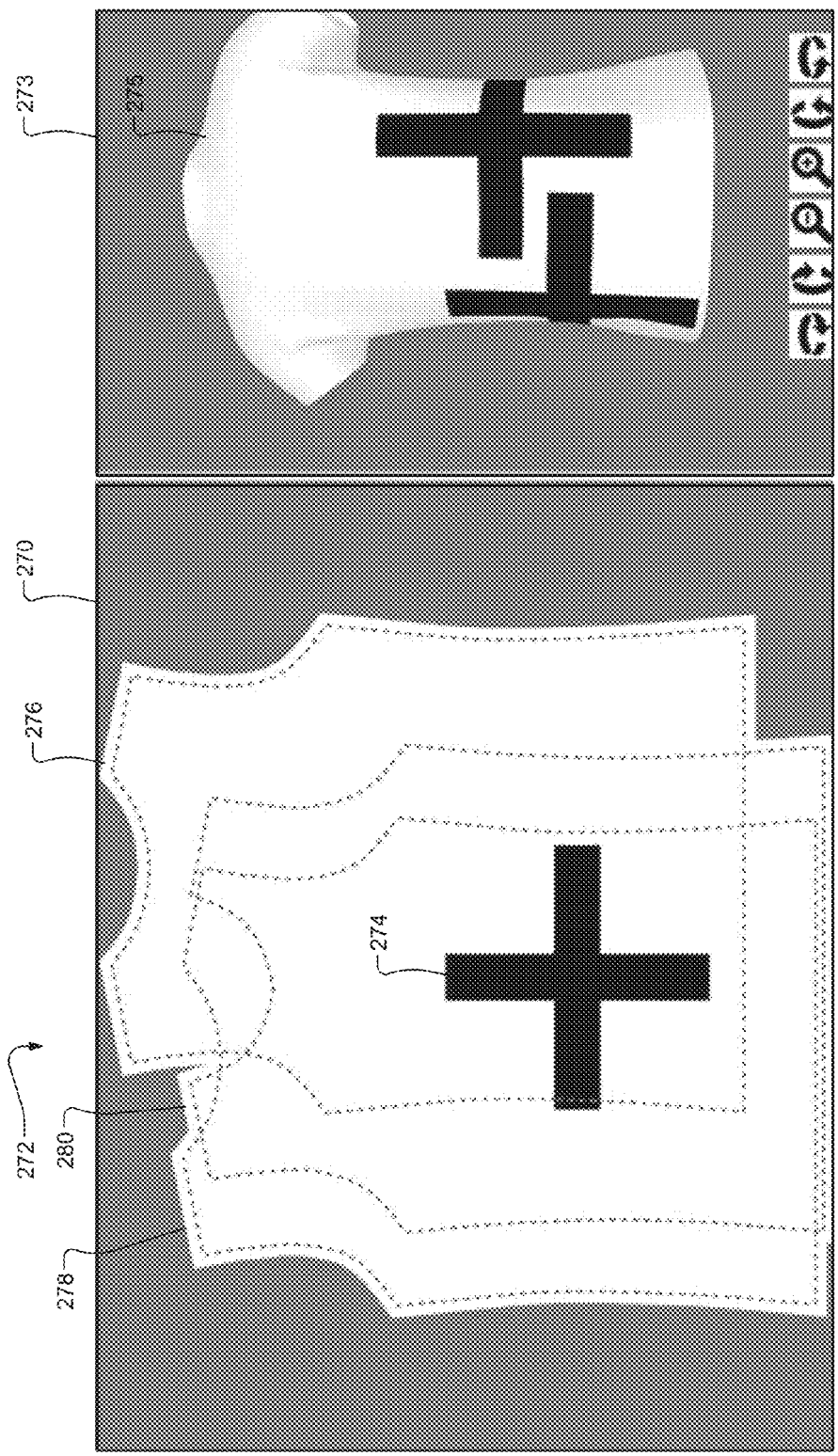
FIG. 9 is a view of a page of a 2D design document and a corresponding 3D model illustrating multiple versions of a same artwork image on the 3D model in accordance with the present disclosure.
Figure 10:
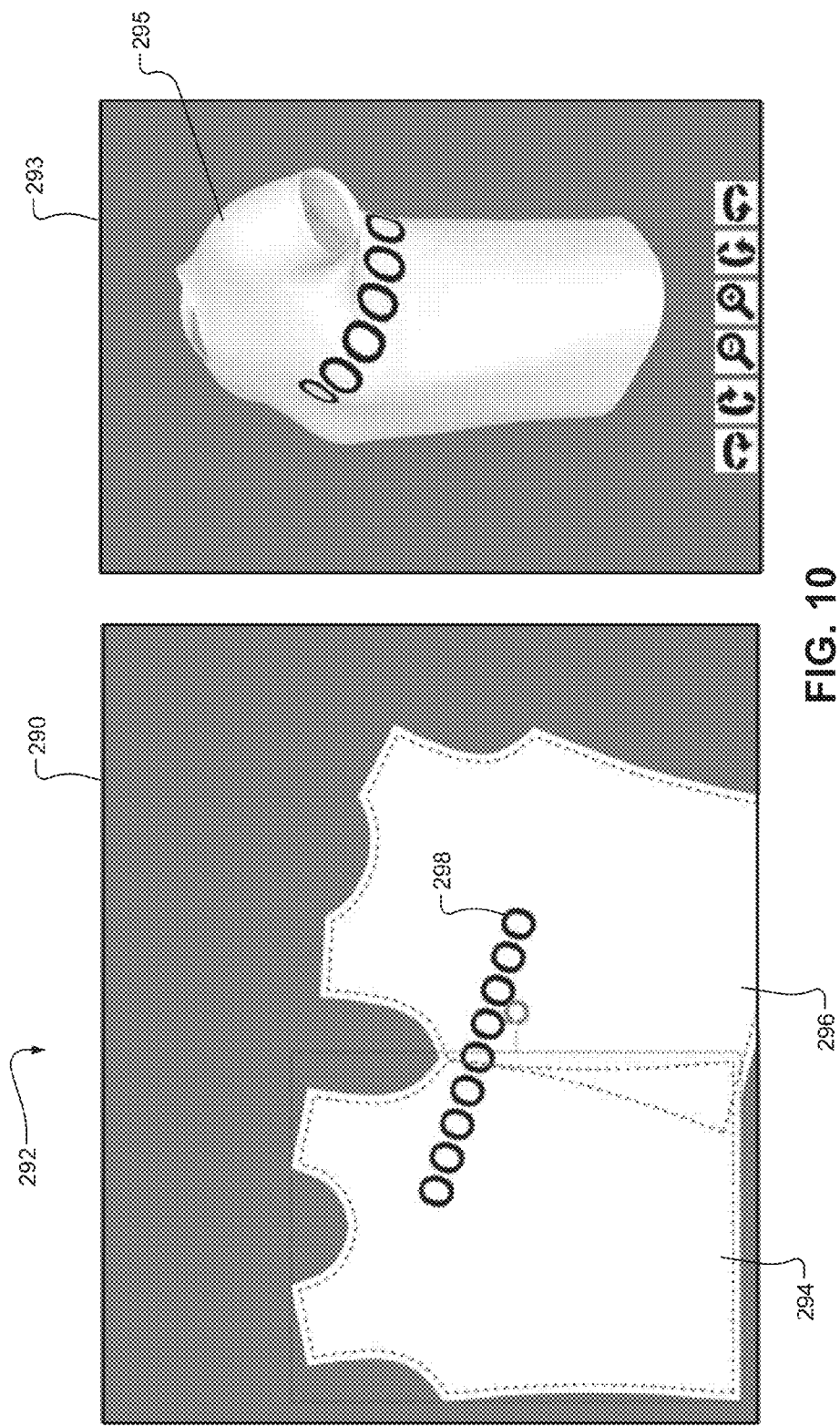
FIG. 10 is a view of a page of a 2D design document having overlapping texture islands with an artwork image and a 3D model illustrating continuous under the arm wrapping of the artwork image in accordance with the present disclosure.

As shown the texture islands 138, 140, 142, 144 are shown having seam lines 146 or lines indicating outlines of viewable areas. The seam lines 146 may not be shown in the window 130. The texture islands 138, 140, 142, 144 are shown in one particular arrangement. Texture islands may be in other arrangements. Additional examples are shown in FIGS. 4-12. The 3D model 136 is shown from a particular camera view, which may be altered by touching on, for example orientation icons in the 3D model window 132. Examples of orientation icons are shown in FIGS. 8-10.

Figure 4:
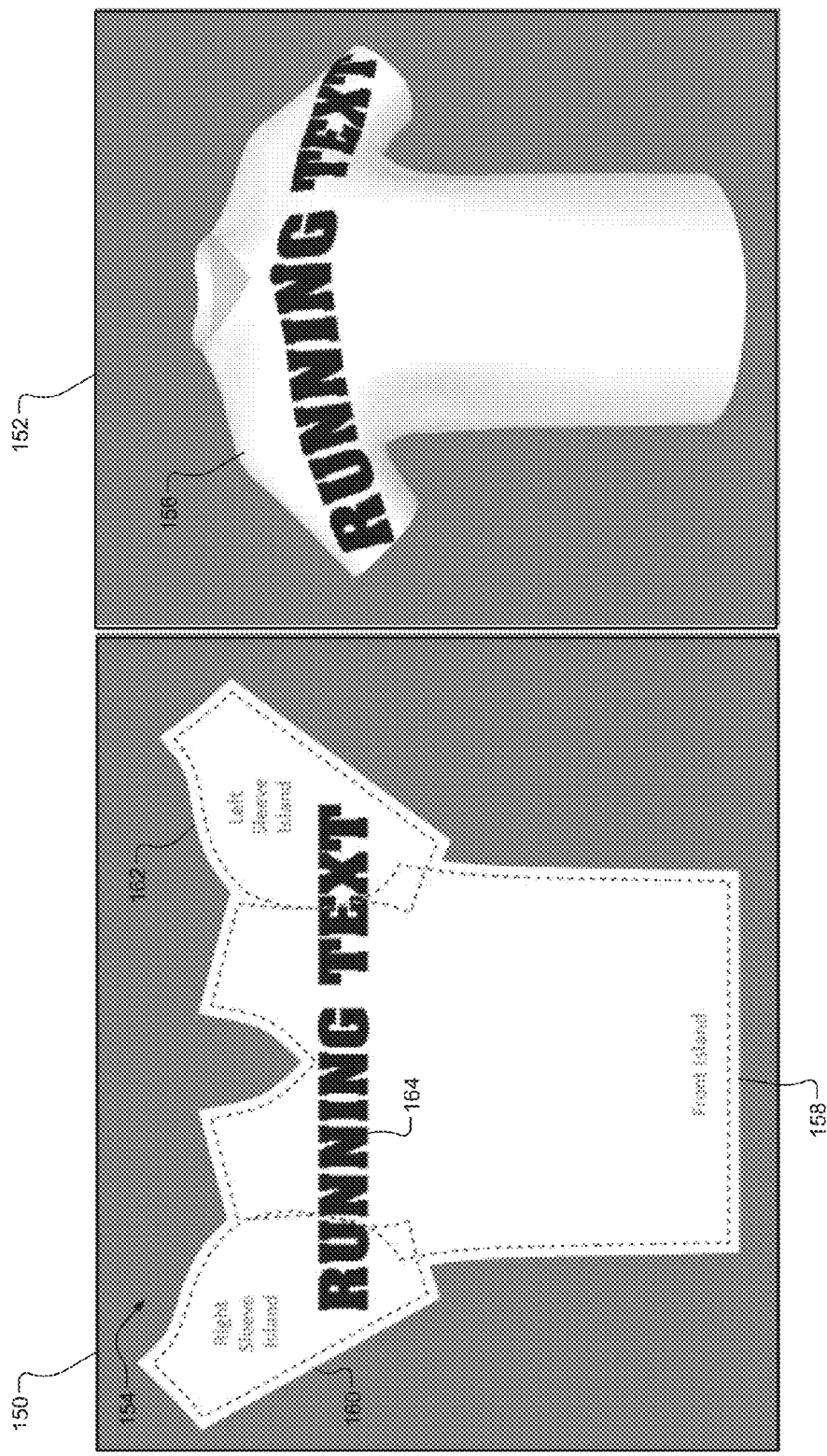
FIG. 4 is a view of a 2D document window and a corresponding 3D model window illustrating another 2D texture island arrangement and a corresponding 3D model in accordance with the present disclosure.

FIG. 4 shows a 2D document window 150 and a corresponding 3D model window 152. The 2D document window 150 shows a 2D texture island arrangement 154. The 3D model window 152 shows a camera view of a corresponding 3D model 156. The 2D texture island arrangement 154 includes a front island 158, a right sleeve island 160 and a left sleeve island 162. The texture islands 158, 160, 162 are placed to overlap each other for wrapping of artwork across a front portion and sleeves of the shirt. Artwork 164 includes text stating "RUNNING TEXT" is shown extending over seam lines of the islands 158, 160, 162. This provides a continuous layout of the artwork 164 on the 3D model 156.

FIG. 5 shows a multi-stage view of pages of a 2D design document representation 170 and corresponding windows 172, 174, a final aggregated texture image 176, and a 3D model 178 in a 3D model window 180. Although a production texture is not shown in FIG. 5, a view of a production texture is similar to (or looks the same as) a view of the final aggregated texture image. Production islands of the production texture are scaled versions of final aggregated texture islands of the final aggregated texture image. The 2D design document, as shown, includes two pages, where each page has a corresponding view of a particular 2D design arrangement (or 2D unwrapping). The 2D design document 170 may include any number of pages. Each page may include any number of 2D design arrangements (or 2D unwrappings of the 3D model 178). This allows multiple pages to be used at the same time allowing a user to design artwork over different arrangements, which can later be included in a single product. As shown, text artwork and non-text artwork is shown. The non-text artwork includes two bands 181 that extend over shoulders of the 3D model 178. Bands corresponding to the bands 181 are shown in the 2D design document 170 and in the production texture.

Each 2D design arrangement may include a complete unwrapping of the 3D model 178 or may include an unwrapping of one or more portions of the 3D model 178. As such, a 2D design arrangement may be directed to a particular area of the 3D model 178 minimizing distortion or generation of artifacts when applying artwork to the 3D model 178. Each of the 2D arrangements may include any number of texture islands and/or any number of the same texture island. Each texture island may have respective portions of artwork or may have same portions of the artwork, as further described below. The artwork, as shown in FIG. 5, includes two bands that wrap over shoulder areas of the 2D model and text ("BACK-FRONT-BACK" and "RUNNING TEXT").

Each page, 2D design arrangement, and/or texture island may have different or the same respective scaling values that are used when generating the final aggregated texture image 176 and/or the corresponding production texture. The 2D design arrangements and artwork may be aggregated and/or scaled to provide the final aggregated texture image 176. The production texture is a scaled version of the final aggregated texture image 176 and may be scaled to actual production sizes. For each page and each texture island in the 2D design document, artwork in borders and overlapping sections of texture islands are clipped and included appropriately in the corresponding UV coordinate space using an inverse of an island transform. The island transform may refer to translation and/or rotation applied to an initial (or base) texture island to provide a texture island of a 2D design document that is part of a particular arrangement. This may occur during a transformation from a 3D model to islands of a 2D design document. The arrangements of the 2D design document are later aggregated and inverse transformed to provide a final aggregated texture image. As an example, in the final aggregated texture image 176, the artwork is cutoff between final aggregated texture islands of the final aggregated texture image 176. Arrows 181 indicate mapping of portions of the artwork "RUNNING TEXT" to sleeve and front islands of the final aggregated texture image 176. However, portions of the artwork are duplicated in hem and/or safety areas of islands in the final aggregated texture image to aid in alignment of produced fabric patterns. This further aids in providing a continuous wrap around look when the fabric patterns are assembled to provide an end result (or shirt). For each page in the 2D design document, position and rotation of the texture islands in the island layer are mapped back to corresponding positions in the UV space. Each texture island and corresponding artwork/image that overlaps with the texture island may be inverse transformed to provide a final aggregated texture image and/or 3D model. For the final aggregated texture image re, this may include clipping the artwork image/figure based on (i) an offset outline of the texture island, or (ii) another offset outline of another texture island.

Figure 6:
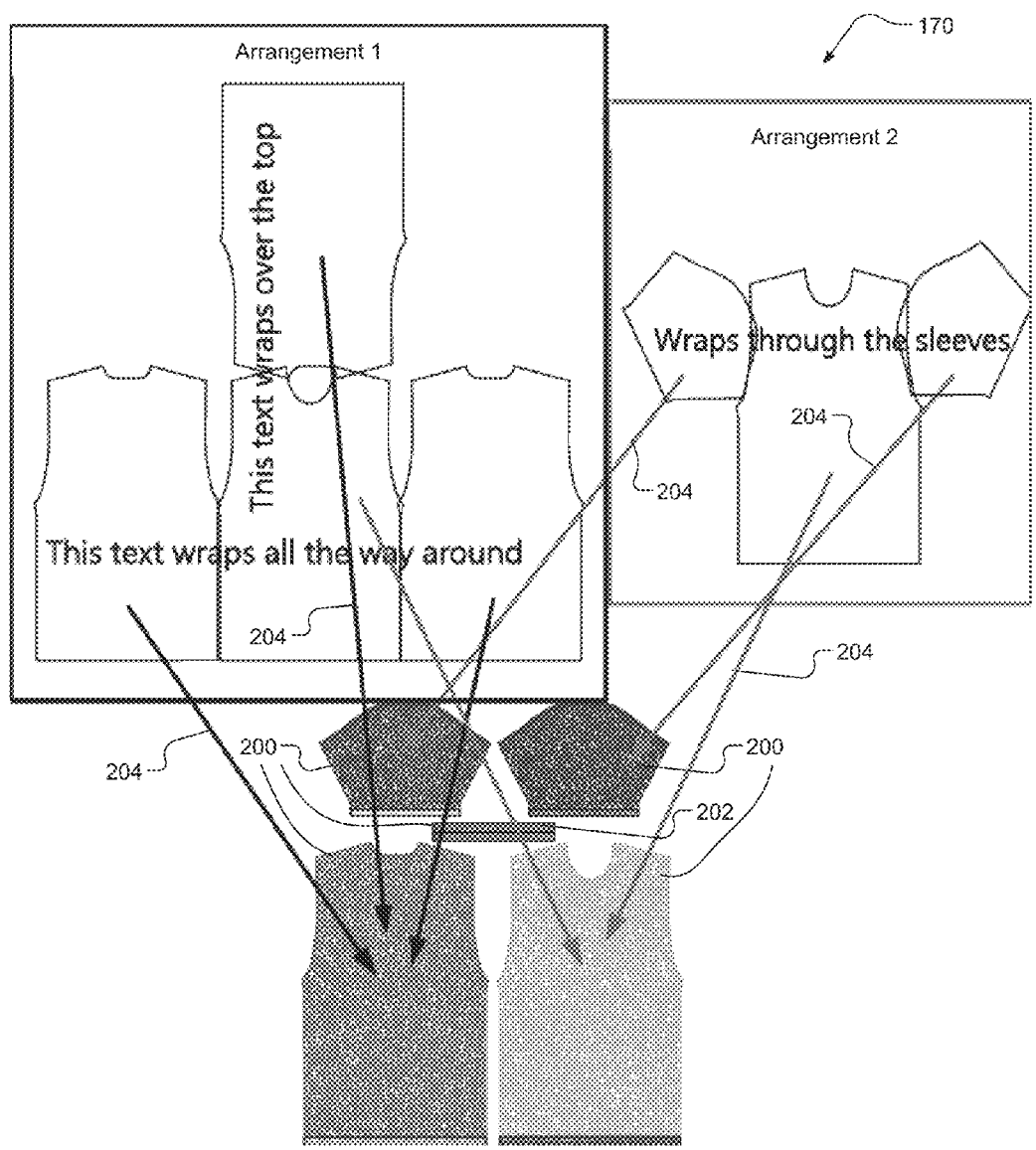
FIG. 6 is a multi-stage view illustrating UV mapping the 2D design document of FIG. 5 to UV maps in accordance with the present disclosure.

FIG. 6 shows a multi-stage view illustrating UV mapping the 2D design document 170 of FIG. 5 to multiple UV maps 200 for each distinctive island (e.g., front island, back island, right sleeve island, left sleeve island, and collar). As an example, two front islands may be different in that the two islands have different corresponding artwork, but are not distinctive as both islands are front islands and refer to the same area of a 3D model. Distinctiveness is thus determined independent of corresponding artwork. The UV maps as shown are each a set of triangles that provide a mesh, which may each have a similar shaped outline as the corresponding texture islands of the 2D design arrangements. Each UV map as disclosed herein may be generated based on corresponding ones of texture islands of a 2D design document and/or a portion of a corresponding 3D model, depending on the conversion process being performed. Each of the UV maps may correspond to a final aggregated texture island in a final aggregated texture image and/or a production island in a production texture. Although the UV maps, as shown, do not appear to include artwork, the artwork may be included in the UV maps, which may become apparent when the UV maps are converted to the 3D model. Mapping of the texture islands to corresponding UV maps is represented by arrows 204. A UV map 202 of a collar is shown as an example. Although not shown, the 2D design document 170 may include one or more texture islands of the collar.

UV mapping as used herein may refer to a transformation performed to wrap a final aggregated texture image into a 3D polygonal model. This transformation may be stored as mapped UV coordinates at each vertex of the 3D polygonal model. For a same 3D polygonal model, multiple UV maps are possible. UV mapping may also refer to a transformation of a 3D model to a final aggregated texture image. UV mapping may also refer to transformation of a 2D design document and/or arrangements of the 2D design document to a 3D model. As used herein, "UV mapping" may not refer to: mapping texture islands of a 2D design document to a final aggregated texture image; mapping from a final aggregated texture image to a 2D design document; and/or mapping a final aggregated texture image to a production texture. The one or more UV maps are 2D image representations of corresponding surfaces of a 3D model. The letters "U" and "V" denote the axes of a 2D texture, whereas "X", "Y" and "Z" may be used to denote the axes of the 3D model. From UV mapping performed, 3D polygons can be traced back to the UV space to provide outlines (or texture islands) of regions, which collectively are used to generate a final aggregated texture image that ends up being wrapped on a 3D model. A corresponding 2D design document includes arrangements of transformed copies of the texture islands.

FIG. 7 shows a multi-stage view illustrating multiple texture island arrangements 210, 212. The texture island arrangements 210, 212 are converted to corresponding UV maps 214, 216, 218. The first texture island arrangement 210 may be of a particular area of a 3D model, such as a shoulder area of a shirt, as shown. The first texture island arrangement 210 is centered around a collar of the shirt and on a shoulder area for ease of designing artwork in the corresponding areas of the shirt. This allows for artwork to be applied over the shoulder area with minimal distortion of and/or border artifacts to the artwork. This also allows for different artwork wrapping strategies, such as applying an artwork in a straight line in sleeve texture islands of a 2D design document and mapping the artwork such that the artwork is curved in a final aggregated texture image. Due to the curving of the artwork in the final aggregated texture image, the artwork may follow a straight line in a corresponding 3D model. Without the curving of the artwork in the final aggregated texture image, the artwork would not show up in the 3D model in a linear fashion as desired. This type of mapping is not intuitive, but allows a designer operating the corresponding system to apply artwork in a certain manner in a 2D design document and for that artwork to be shown in a 3D model as the designer would expect. As a result, the stated mapping accounts for curvatures in the 3D model. A UV map is generated for each distinctive texture island shown in the 2D design document. If one or more multiple pages/2D design arrangements include the same texture island (e.g., multiple pages/2D design arrangements include multiple front texture islands), the multiple versions of the same texture island are aggregated to provide a single UV map. In the example shown, one of the pages/2D design arrangements includes two versions of a back texture island are shown. The two versions of the back texture islands are aggregated to provide a single back UV map.

The UV maps may then be converted to a 3D model 220, which may then be mapped to a single set of UV maps (or UV islands) 230. The single set of UV maps 230 includes a single UV map per distinct island of the corresponding manufacturable item (e.g., a shirt as shown). The single UV map may then be converted to a final aggregated texture image 232 having final aggregated texture islands 234. There is a one-to-one island relationship between the islands of the final aggregated texture image 232 and the maps of the set of UV maps 230. Although not shown, the final aggregated texture image 232 may be mapped back to the 3D model 220. From the example of FIG. 7, it can be seen that multiple UV maps may be used when generating a 3D model and/or a final aggregated texture image. Thus, one or more UV maps may be used.

FIG. 8 shows a view of windows (or pages) 240, 242 of a 2D design document 244 having artwork images 246, 248 and a corresponding 3D model window 250. The 3D model window shows a particular camera view of a 3D model 252. The artwork images 246, 248 continuously wrap around a portion of a mid-section of the 3D model 252. As shown, the first artwork image 246 is not disjointed and is applied across a front island 254 and two back islands 256, 258. Beginning and end portions of the second artwork image 248 are on back islands 260, 262. A mid-portion of the second artwork image 248 is not on a texture island and as such the second artwork image 248 is disjointed. A first portion of the second artwork image extends in a first direction across the 3D model 252. A second portion of the second artwork image extends in a second direction across the 3D model 252. The portion of the second artwork image 248 that is not on the back islands 260 is not shown on the 3D model 252. As can be seen, the arrangement of texture islands relative to each other, the number of each type of texture island, and the location of artwork on the texture islands provides a large amount of design freedom in how the artwork is applied to a 3D model. An arbitrary number of arrangements may be generated. A user may create and apply text and graphics in the 2D design space, which may then be mapped to the 3D model for viewing. The 3D model window 250 includes rotation icons 262 for rotating the 3D model 252 and for viewing of different camera views of the 3D model 252. In FIG. 8, a rotation indicator 268 is shown for rotating the second artwork image 248.

FIG. 9 shows a view of a page (or window) 270 of a 2D design document 272 and a 3D window 273 having a 3D model 275. The 2D design document 272 has a single artwork image 274 on overlapping texture islands 276, 278, 280. The 3D model 275 has multiple versions of the artwork image 274. The mapping of the artwork image 274 from the texture islands 276, 278, 280 to the 3D model 275 is based on where the artwork image is placed on the texture islands 276, 278, 280 and the corresponding mapping parameters of each of the texture islands. The mapping parameters may include scaling values, stretching values, rotating values, coloring values, distorting values, offsetting values, etc. The mapping parameters can cause the artwork image 274 to be: sized smaller or larger than that shown in the 2D design document 272; rotated and/or offset from where the artwork image 274 is placed on a texture island; colored differently and/or having a different design pattern; distorted; and/or affected in some other manner. As a result, a user is able to scale an artwork image differently by placing the artwork image over multiple texture islands, where each of the texture islands has a different scaling conversion parameter.

FIG. 10 shows a view of a page (or window) 290 of a 2D design document 292 and a 3D model window 293 with a 3D model 295. The 2D design document 292 has overlapping texture islands 294, 296 with an artwork image 298. FIG. 10 is another example of how texture islands may be arranged relative to each other and how artwork may be applied to extend and wrap under an armpit area of a shirt. The artwork image 298 spans across the texture islands 294, 296. Although the artwork image 298 is clipped at viewable edges (identified by the dashed seam lines) of the texture islands 294, 296, the artwork image 298 is continuous (not disjointed) in the 3D model 295. This is because the two portions (first portion on the texture island 294 and second portion of the texture island 296) of the artwork image 298 are adjacent each other at the seam under the armpit area of the 3D model 295. In FIG. 10, the seam is not shown in the 3D model, but may be represented by a vertical line extending from a point in a center of the armpit area down to the bottom of the shirt. Since the artwork image 298 spans across two different texture islands, the artwork image when mapped to the UV space also spans across two different UV maps.

Edge forwarding may be used to wrap/span artwork across edges of adjacent and/or overlapping texture islands. The edges may be for example on seam lines and/or adjacent edges of viewable areas of the texture islands. A first edge of or curve on a first texture island may have a corresponding second edge or curve on a second texture island. A first portion of artwork image may span across the first texture island in a first direction having a first vector. Based on an angled relationship between the first vector and the first and second curves indicates a second direction having a second vector at which a remaining (or second portion) of the artwork image spans across the second texture island. This determination may be performed by the conversion module 108, the 2D design document module 110, and/or other module of FIG. 2.

Continuing with the same example, the first curve of the first texture island may overlap and/or be at an angle relative to the second curve of the second texture island. The first curve and the second curve may be on, crossover, and/or follow portions of respective seams of the first and second texture islands. The first curve and the second curve may be in, extend out of or be outside viewable areas of the first and second texture islands. Angles of the second vector relative to the first curve and/or the second curve may be the same or different than the angles of the first vector relative to the first curve and/or the second curve. Although in the above example, a single vector is determined for each texture island, any number of vectors may be determined for each texture island. A first set of vectors may be determined for the first texture island and a first portion of the artwork image and a second set of vectors may be determined for the second texture island and a second portion of the artwork image. Edge forwarding allows the second portion of the artwork image to extend in a different direction than the first portion of the artwork image.

Edge forwarding may be used to account for manufacturing inaccuracies at a seam over which the artwork image is wrapped. Edge forwarding may be used to adjust for an inaccuracy, for example, in attaching fabric patterns in a direction perpendicular to a seam, where seam lines of the fabric patterns are not accurately aligned and/or abutted.

Figure 11:
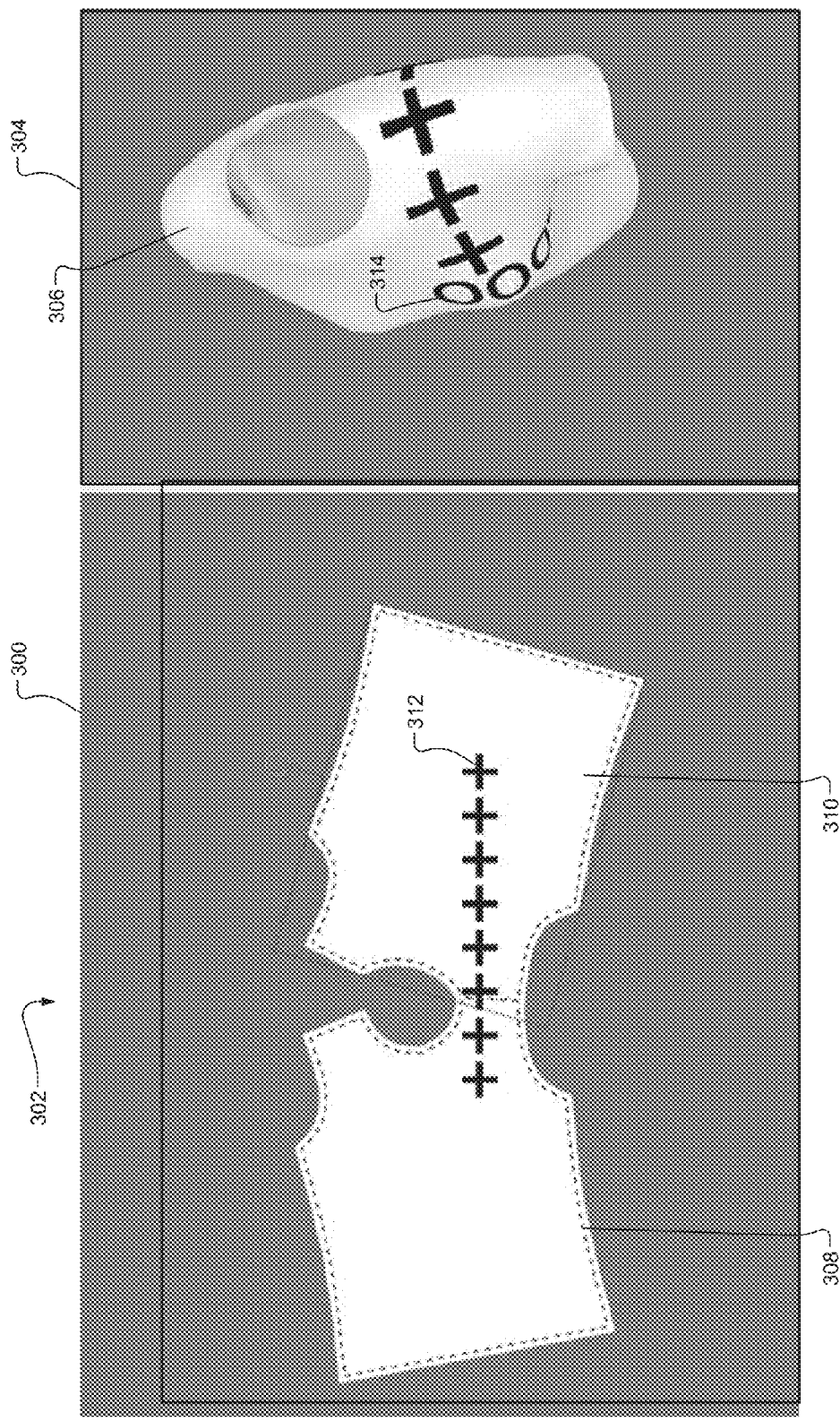
FIG. 11 is a view of a page of a 2D design document having overlapping texture islands with an artwork image and a 3D model illustrating continuous over the shoulder wrapping of the artwork image in accordance with the present disclosure.

FIG. 11 shows a view of a page (or window) 300 of a 2D design document 302 and a 3D model window 304 having a 3D model 306. The 2D design document 302 has overlapping front and back texture islands 308, 310 with an artwork image 312. Only one page of the 2D design document 300 is shown. The 2D design document 300 may include another page having a second artwork image which has a representation shown in the 3D model 306 and designated 314. The second texture island 310 is rotated and placed relative to the first texture island 308 such that tops of a left shoulder are in contact with each other to allow the artwork image 312 to continuously wrap over a left should area of the 3D model 306.

The artwork image 312 is scaled up for the 3D model 306 as shown. The artwork image 312, due to the placement on the texture islands 308, 310, extends vertically down a top portion of a front side of the 3D model 306 and diagonally down a back side of the 3D model 306. A transversal of the artwork image 312 across the texture islands 308, 310 may be based on an angle of the first texture island 308 relative to the second texture islands 310.

As can be seen, a single artwork image (or single graphic design) can be applied across multiple texture islands. The corresponding system via the above-described modules can clip the artwork image at one or more appropriate locations without a user needing to duplicate the artwork image and manually clipping the versions of the artwork image. Also an artwork image can be applied across textures islands of different sizes.

Figure 12:
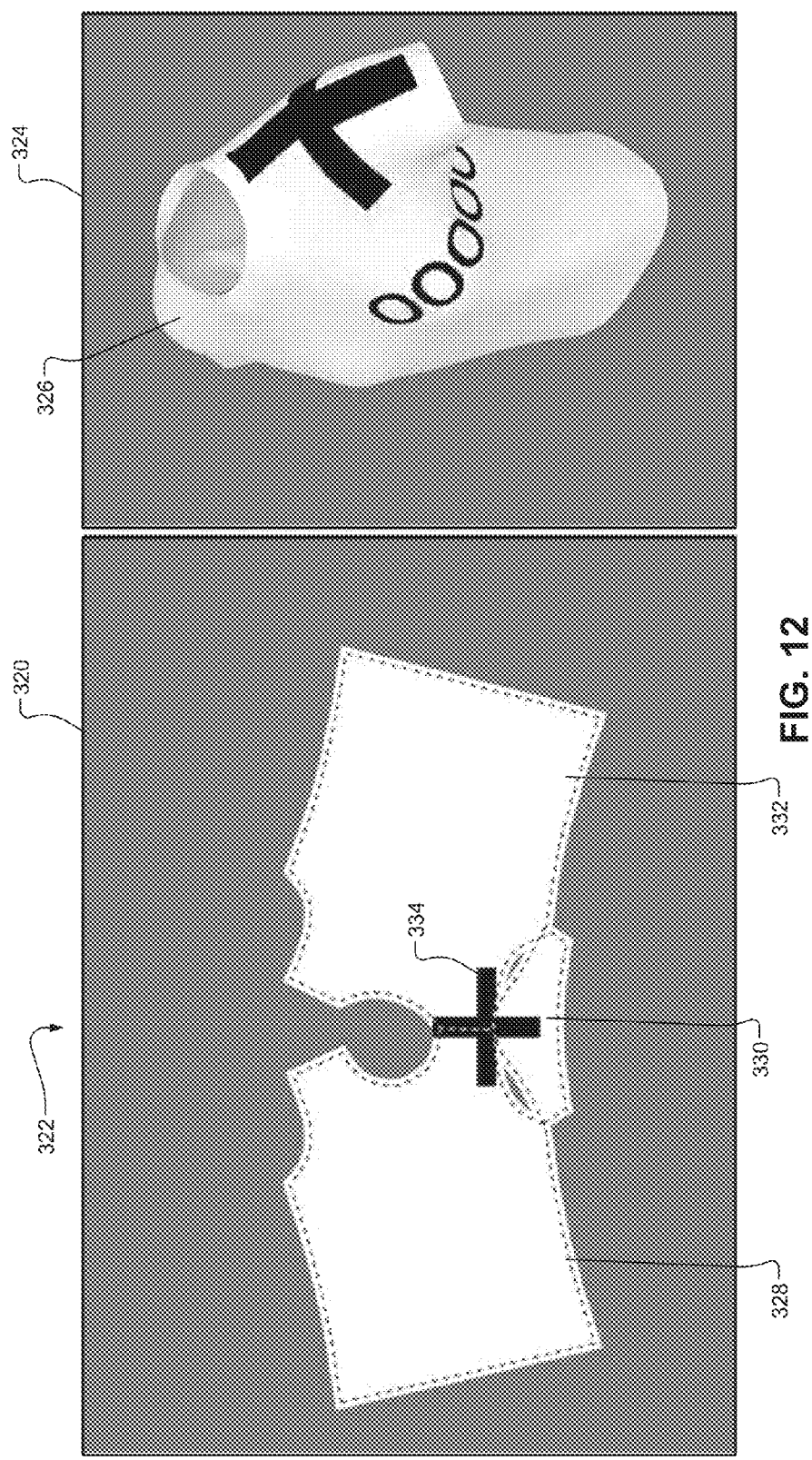
FIG. 12 is a view of a page of a 2D design document having overlapping texture islands with an artwork image and a 3D model illustrating continuous over the shoulder and along a sleeve wrapping of the artwork image in accordance with the present disclosure.

FIG. 12 shows a view of a page (or window) 320 of a 2D design document 322 and a 3D model window 324 having a 3D model 326. The 2D design document 322 has overlapping texture islands 328, 330, 332 with an artwork image 334. The texture islands 328, 330, 332 are front, left sleeve, and back islands. The texture islands 328, 330, 332 are arranged to allow the artwork image 334 to continuously extend over a shoulder and along a seam and top portion of a sleeve of the 3D model 326 of a shirt.

Figure 13:
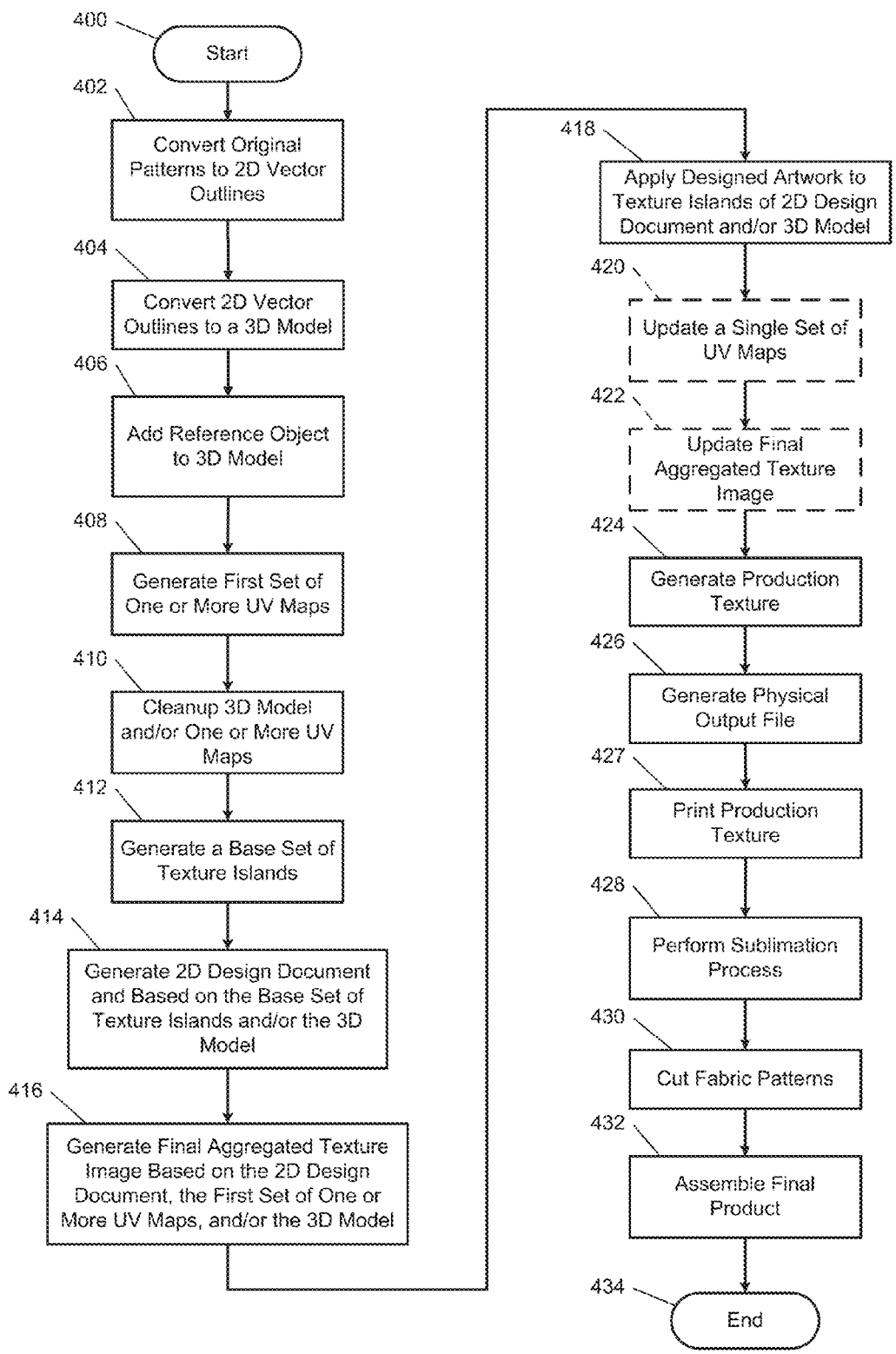
FIG. 13 illustrates a design and manufacturing method in accordance with the present disclosure.
Figure 15A:
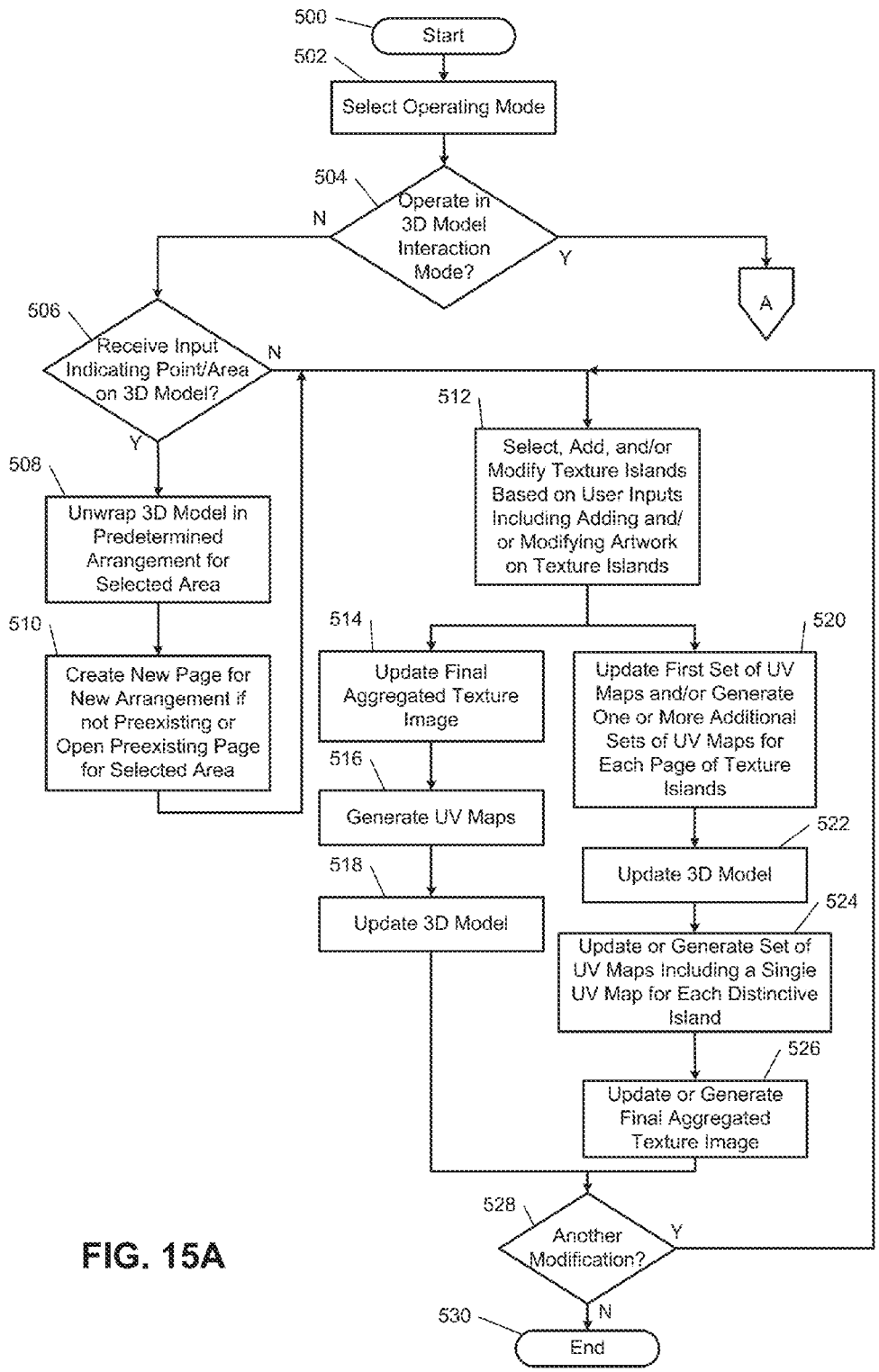
FIGS. 15A-15B (collectively FIG. 15) illustrates a 3D interaction method in accordance with the present disclosure.
Figure 15B:
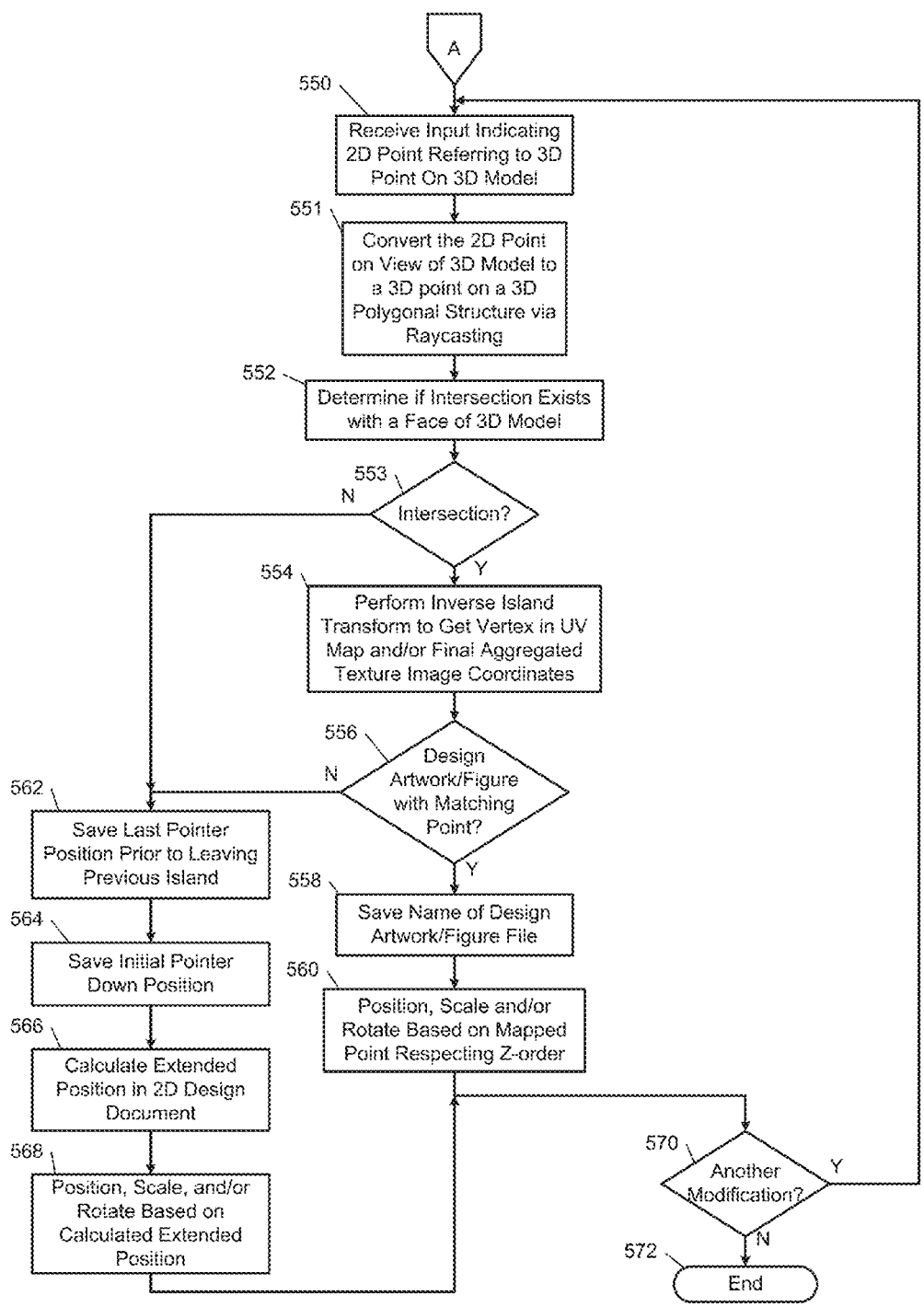

The design and manufacturing systems disclosed herein may be operated using numerous methods, example methods are illustrated in FIGS. 13 and 15. In FIG. 13, a design and manufacturing method is shown. Although the following tasks are primarily described with respect to the implementations of FIGS. 1-12, the tasks may be easily modified to apply to other implementations of the present disclosure. The tasks may be iteratively performed.

The method may begin at 400. At 402, original patterns of an item to be manufactured are converted to 2D vector outlines. As an example, the pattern module 100 may receive original patterns of a clothing article, which are converted to 2D vector outlines. This includes accounting for hem areas, safety areas, and viewable areas.

At 404, the 2D vector outlines are converted to a 3D model via the 3D simulation module 116. At 406, a 2D reference object (e.g., a rectangle) is added to the 3D model. The 2D reference object may be of a predetermined size and is representative of a rectangular area on the item to be manufactured, where the rectangular area has predetermined dimensions (e.g., 1 inch by 1 inch). The 2D reference object may be used as a key for scaling the 3D model to actual sizes for islands of a production texture. A 3D model file of the 3D model may be in a 3D format, such as a .fbx file.

At 408, the 3D simulation module 116, the UV mapping module 114, and/or the conversion module 108 generates a first set of one or more UV maps based on the 3D model. The 3D model may be unwrapped in a predetermined manner to provide UV maps that are similar in shape as the original patterns. At 410, the 3D simulation module 116 and/or the artwork wrapping module 30 may clean up the 3D model and/or one or more of the UV maps generated at 408. This may include correcting imperfections, interpolating between points to add line segments, adding esthetic improvements and/or performing other cleanup tasks as described above.

At 412, the UV mapping module 114 may trace the 3D model to provide a base (or default) set of patterns (or texture islands). Outlines of the base set of texture islands may be similar to outlines of the original patterns. This base set of texture islands may in following tasks be used to generate one or more 2D design arrangements. The base set of texture islands may be modified and/or copied. Additional texture islands may be added to the base set of texture islands and/or to copied versions of the base set of texture islands. One or more islands within the base set of texture islands may be copied and added to one or more of the 2D design arrangements. The modifications may include adding, scaling, rotating, and/or positioning one or more of the texture islands.

At 414, the 2D design document module 110 generates a 2D design document including at least a first page having a first arrangement of the base set of texture islands. This may include unwrapping the 3D model in one or more predetermined layouts to provide additional arrangements that are included in the first page or in other pages of the 2D design document. At 416, the aggregation module 111 generates a final aggregated texture image based on the 2D design document, the first set of one or more UV maps, and/or the 3D model. The final aggregated texture image may include rasterized bitmap data generated based on vector data of the 2D design document and/or the first set of UV maps.

Although task 416 is shown as being performed subsequent to task 414, task 416 may be performed prior to and/or while task 414 is being performed.

At 418, the design module 118 applies one or more designed artwork images (or figures) to the 3D model and/or texture islands of the 2D design document. This may include adding pages, texture islands, and/or arrangements to the 2D design document. A user may freely move, orient, rotate, and/or modify texture islands during this task. The user may add artwork (e.g., images, figures, text, and/or other artwork) to the texture islands. Task 418 may also include updating the first set of one or more UV maps and final aggregated texture image and/or generating one or more additional UV maps, sets of UV maps, and/or final aggregated texture images. Task 418 is further described with respect to the method of FIG. 14.

At 420, an updated single set of UV maps may be generated if not already generated during task 418. At 422, an updated final aggregated texture image is generated if not already generated during task 418. At 424, production texture module 112 generates a production texture based on the updated final aggregated texture image. At 426, the artwork wrapping module 30 generates a physical output file for the printer 14.

At 427, the printer 14 prints the production texture on heat transfer paper, as described above. At 428, the heat press 16 applies heat to the printed paper and corresponding fabric to perform a sublimation process thereby transferring artwork on the printed paper to the fabric. At 430, the cutter 18 and/or other suitable cutter cuts the fabric to provide fabric patterns. At 432, the fabric patterns are sewn and/or attached to each other to provide an end product. The method may end at 434.

Figure 14:
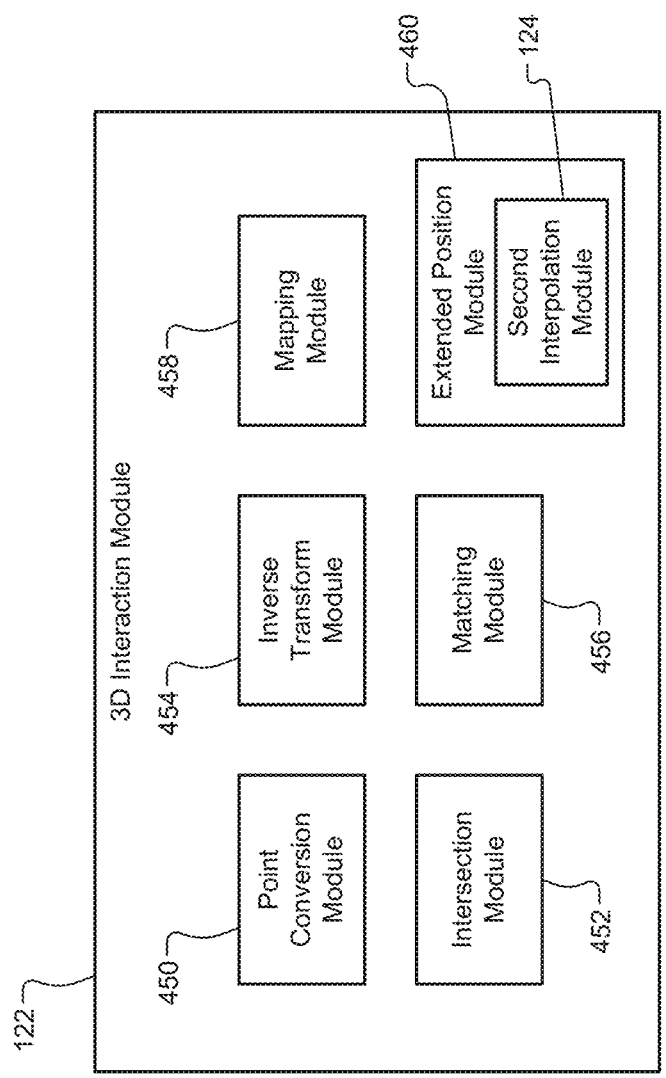
FIG. 14 is a view of a functional block diagram of a 3D interactional module in accordance with an embodiment of the present disclosure.

FIG. 14 shows the 3D interaction module 122 of FIG. 2. The 3D interaction module 122 may include a point conversion module 450, an intersection module 452, an inverse transform module 454, a matching module 456, a mapping module 458 and an extended position module 460. The extended position module 460 may include the second interpolation module 124. The modules 450, 452, 454, 456, 458 and 460 are described below primarily with respect to FIG. 15B.

In FIG. 15, a 3D interaction method is shown. Although the following tasks are primarily described with respect to the implementations of FIGS. 1-14 and 16-18, the tasks may be easily modified to apply to other implementations of the present disclosure. The tasks may be iteratively performed.

The method may begin at 500. At 502, an operating mode is selected. The artwork wrapping module 30 may select an operating mode based on a user input. In one embodiment, the 3D interaction module 122 may select a default operating mode. The artwork wrapping module 30 may operate in a 3D interaction mode, a 2D interaction mode, or a combine mode. The 3D interaction mode refers to viewing a 3D model window including a 3D model of a product to be manufactured and applying, modifying, moving, scaling, positioning, and/or rotating artwork in the 3D model window based on user inputs via the user interface 26. During the 3D interaction mode, pages of a 2D design document may not be visible to a user. The 2D interaction mode refers to viewing a 2D design document (i.e. windows showing 2D arrangements of texture islands associated with pages of the 2D design document) for the product to be manufactured and applying, modifying, moving, scaling, positioning, and/or rotating artwork on the texture islands of the 2D design document based on user inputs via the user interface 26. During the 2D interaction mode, a 3D model may be viewable to a user. During the 2D interaction mode, a user may click on a point on a 3D model to have a particular arrangement of texture islands generated in the 2D design document. The combined mode refers to operating in both the 3D interaction mode and the 2D interaction mode.

At 504, the artwork wrapping module 30 may determine whether the operating mode is the 3D interaction mode. If the operating mode is the 2D interaction mode or the combined mode, task 506 is performed. If the operating mode is the 3D interaction mode, task 550 is performed. Note that although FIG. 15 is shown as performing tasks 550-570, if the operating mode is the 3D interaction mode, tasks 550-570 may be performed when operating in the combined mode depending on how the combined mode is implemented. For example, tasks 550-570 may be performed while operating in the combined mode and when a user is working in a 3D model window and moving artwork on a 3D model.

At 506, the artwork wrapping module 30 and/or the unwrapping module 106 may receive a user input for a point/area on a 3D model. For example, the user may have clicked a mouse button while a pointer of the mouse was over the point/area of the 3D model. This area on the 3D model may be an area of interest for where artwork is applied or is to be applied.

At 508, the unwrapping module 106 may unwrap the 3D model and/or a portion of the 3D model in a predetermined arrangement for the selected point/area of the 3D model as indicated by the user input. If the 3D model has already been unwrapped for the selected point/area, task 508 may be skipped. In one embodiment, the 3D model is predivided into predetermined areas. The predetermined areas may overlap each other. A first predetermined area may include, be separate from, be adjacent to, and/or overlap a second predetermined area. If the user points with the pointer and clicks within one of the predetermined areas, the unwrapping module 106 unwraps the 3D model and/or respective portions of the 3D model based on the predivided area selected. The 3D model is unwrapped to provide a preselected unwrapping of one or more texture islands for the predivided area selected. If the user clicks on a point that is in more than one of the predivided areas, then the unwrapping module 106 may unwrap (i) the 3D model in the predivided area having the highest z-order, or (ii) the 3D model multiple times (once for each of the predivided areas corresponding to the point selected). Each of the predivided areas has a corresponding preselected unwrapping of one or more texture islands.

At 510, the 2D design document module 110 may (i) create one or more new pages for one or more new arrangements of texture islands based on the unwrapping performed at 508, or (ii) open one or more preexisting pages based on the selected point/area. Task 512 may be performed subsequent to task 510.

At 512, the design module 118 and/or the 2D design document module 110 may select, add, and/or modify texture islands of the 2D design document based on user inputs including adding and/or modifying artwork on the texture islands. This may include a user providing user inputs to add, position, scale, rotate and/or otherwise place artwork on the texture islands in 2D windows showing the texture islands.

Subsequent to tasks 512, tasks 514, 516, 518 may be performed or tasks 520, 522, 524, 526 may be performed depending on: a mode of operation; a number of pages and/or arrangements in a 2D design document; a number of sets of UV maps being generated; and/or whether one of the arrangements is for only a particular portion of the 3D model. As an example, if multiple sets of UV maps are to be generated and/or if one of the arrangements in the 2D design document is for only a particular portion of the 3D model, then tasks 520, 522, 524, 526 may be performed. In one embodiment, tasks 514, 516, 518 are not performed. In another embodiment, tasks 520, 522, 524, 526 are not performed.

At 514, the aggregation module 111 may generate a final aggregated texture image, if not already generated, and/or update the final aggregated texture image based on the modifications to the 2D design document performed at 512. This includes mapping and aggregating the texture islands including corresponding artwork of the 2D design document to the corresponding islands of the final aggregated texture image. The final aggregated texture image includes distinctive islands (not duplicate versions of the same island).

At 516, the UV mapping module 114 may generate UV maps, if not already generated, and/or modify the UV maps based on the final aggregated texture image. Task 516 may be performed while task 514 us performed. A UV map may be generated for each of the distinctive islands of the final aggregated texture image. This may include automatic UV map edge finding and scaling to real (actual) production sizes, such that a 3D model file can be generated to design and manufacture apparel or other products. At 518, the 3D simulation module 116 may update the 3D model based on the UV maps and generate the 3D model file.

Tasks 514, 516, 518 may be iteratively performed for each change performed at 512 and/or at a predetermined rate. For example, this may occur at a predetermined rate of 30 updates per second to provide real time updates or updates that appear to occur in real time to a user. Although tasks 514, 516, 518 are shown as being performed in a particular order, the tasks 514, 516, 518 may be performed in a different order.

At 520, the UV mapping module 114 may update a first set of UV maps (may be the first set of UV maps generated at 408, 410 of FIG. 13) and/or generate one or more additional sets of UV maps for each page of texture islands. This may include automatic UV map edge finding and scaling to real (actual) production sizes, such that a 3D model file can be generated to design and manufacture apparel or other products. At 522, the 3D simulation module 116 may update the 3D model based on the UV maps updated and/or generated at 520.

At 524, the UV mapping module 114 updates and/or generates a set of UV maps, where the set of UV maps includes a single UV map for each distinctive island in a final aggregated texture image. The UV maps in the set of UV maps are distinctive. At 526, the aggregation module 111 generates and/or updates a final aggregated texture image based on the set of UV maps.

Tasks 520, 522, 524, 526 may be iteratively performed for each change performed at 512 and/or at a predetermined rate. For example, this may occur at a predetermined rate of 30 updates per second to provide real time updates or updates that appear to occur in real time to a user. Although tasks 520, 522, 524, 526 are shown as being performed in a particular order, the tasks 520, 522, 524, 526 may be performed in a different order. Tasks 512, 514, 516, 518, 520, 522, 524, 526 allow a user to apply artwork in 2D space, where the artwork is converted in real time to a final aggregated texture image used to render a 3D model.

At 528, the artwork wrapping module 30 determines whether another modification is to be performed. If another modification is to be performed, task 512 is performed, otherwise the method may end at 530. Task 420, 422, and/or 424 of FIG. 13 may be performed subsequent to task 528.

The following tasks 550-570 may be performed by the 3D interaction module 122. At 550, the artwork wrapping module 30 and/or the unwrapping module 106 may receive a user input for a point on a 3D model. The point selected is a 2D point on a camera view of the 3D model. For example, the user may have clicked a mouse button while a pointer of the mouse was over the point of the 3D model. This point on the 3D model may be in an area of interest where artwork is applied or is to be applied. Tasks 550-570 may be iteratively performed. During a first iteration, the user may click on a point on the 3D model and in subsequent points may move the mouse pointer to drag (or move) artwork on the 3D model. The mouse pointer may be moved off of the 3D model to cause the artwork to wrap around the 3D model. Such that a portion of the artwork may not be seen in the 3D window unless the 3D model is rotated.

At 551, the point conversion module 450 converts the 2D point on a camera view of a 3D model, indicated by the user input, to a 3D point of a 3D polygonal structure via ray casting. For a first iteration of tasks 550-570, the 2D point and 3D point may refer to initial points having a corresponding initial point on an initial texture island of a 2D design document. When a user clicks on a 3D model view, a 2D pointer is mapped to the 3D polygonal structure based on current camera view settings. Each texture island in the 2D design document has an associated transformation to a respective portion of the 3D model.

At 552, the intersection module 452 determines whether there is an intersection between (i) a ray (e.g., a ray of light) casted from the 2D point, and (ii) the 3D polygonal structure. This may be based on the 3D point. At 553, if there is an intersection, an intersection face index is determined indicating where a 3D face on the 3D model was intersected and task 554 may be performed, otherwise task 562 may be performed.

At 554, the inverse transform module 454 performs an inverse island transform to obtain a vertex in UV space coordinates and/or coordinates in a final aggregated texture image. The vertex is determined based on the intersection face index and/or the 3D point. The vertex may refer to 3 adjacent points of a triangle located in the UV space. A de-interpolation may be performed to determine coefficients from a triangle on the 3D face of the 3D model and the coefficients are then used to interpolate a triangular 2D face in the UV space. The de-interpolation may be from a center or edge of the triangle on 3D face to center or edge of a triangle in UV and/or 2D space. For example points of the triangle in the 3D space may be multiplied (or weighted) by respective coefficients to estimate the points of the triangle in the UV and/or 2D space. A sum of the coefficients may be equal to 1. The coefficients may refer to weights for estimation of points of the triangle in the UV and/or 2D space.

At 556, the matching module 456 determines whether there is artwork/figure with a matching point corresponding to the vertex in the 2D design document. The vertex and coordinates in the final aggregated texture image may correspond to one or more pages and/or arrangements in the 2D design document. This is because points, as described above, that are in different texture islands, different arrangements, and/or different pages can map to the same 3D point on a 3D model. For example, a first point of a first texture island of a first page, a second point of a second texture island of the first page, and a third point of a third texture islands of a second page may map to the same point on a 3D model. For this reason, once points of a 2D design document have been mapped to a point of a final aggregated texture image, a reverse mapping of the point in a final aggregated texture image may not be able to be mapped back to the multiple points in the 2D design document. The point in the final aggregated texture image may not be able to be mapped back without having information regarding the points in the 2D design document. As a result, the point in the final aggregated texture image may be mapped back to a single point in the 2D design document, for example, on a texture island having the highest z-order. The z-orders of texture islands, points, triangles, etc. may be recorded in the memory and continuously updated.

To determine whether there is a matching point, inverse mapping is performed and includes following a z-order of the texture islands and/or artwork in the 2D design document. The page with the highest z-order and the texture island on that page with the highest z-order that has a match is selected. The 3D interaction module 122 determines whether a match exists during each comparison between the vertex and points in the texture islands. When a match (sometimes referred to as a hit) is found, task 558 is performed. As an alternative, all matching points regardless of z-order may be selected.

At 558, the name (or identification) of the first texture island found with the match is stored in memory (e.g., the memory 28). This texture island may be used throughout a whole 3D interaction period for mapping back of 3D points. At 560, the mapping module 458 positions, scales, and/or rotates artwork that is associated with the match and is on the first texture island. This is accomplished while respecting the z-order of the artwork corresponding to the matched point. If more than one artwork/figure is over the matched point, the artwork/figure with the highest z-order is selected and positioned, scaled, and/or rotated. Mouse pointer positions and/or click events associated with translation, dragging, rotating, scaling are transformed to the 2D design document space.

As an example, if the user clicks on artwork on a 3D model and drags the pointer to move the artwork and all of the points for that movement are in the same camera view and the same texture island in the 2D design document, then tasks 558-560 are iteratively performed. The iterative performance of tasks 558-560 may not include interpolation as described below with respect to task 566. The artwork/figure is moved following mouse positional movement using ray casting, as described above. Subsequent to task 560, task 570 may be performed.

Tasks 562, 564, 566, 568 are performed when there is not a matching point on the artwork/figure. This may occur when the artwork/figure is being wrapped around the 3D model and/or when there is not a matching point on the initial texture island. The mouse pointer may have been moved off of the 3D model (or 3D polygonal structure) and/or may have been moved off of a 3D point corresponding to a point on the initial texture island. Since there is not a matching point on the initial texture island, the 3D point cannot be mapped back to the initial texture island as performed during tasks 558-560. In order to map movement of the mouse pointer crossing texture island borders to a point that is off of the initial texture island back to a point on another texture island, tasks 562, 564, 566, 568 are performed. Performance of tasks 562, 564, 566, 568 provides an approximation of how to move the artwork/figure based on the movement of the mouse. Movement of the artwork/figure across borders of different texture islands is not noticeable to the user using this method, as a smooth transition across the borders is provided.

At 562, a last position of the pointer prior to the pointer being moved to a 3D point that does not correspond to a point on the initial (or previous) texture island is saved in the memory. In subsequent iterations of tasks 550-570, the initial texture island may be replaced with a current texture island. When the mouse moves to a 3D point that is not on the current texture island, the current texture island becomes the previous texture island. At 564, the initial pointer position (sometimes referred to as the initial down position) is saved in the memory. The initial pointer position and the last pointer position can provide a vector indicating a direction the mouse is being moved relative to the 3D model. This direction of travel in addition to a current mouse pointer location can be used to approximate where to move the artwork/figure. Task 564 may be performed during task 550.

At 566, the extended position module 460 calculates an extended position in the 2D design document. The extended position refers to a point in the 2D design document to which the 3D point is mapped. As an example, the extended position (designated Cd) may be determined using an interpolation approximation based on equations 1-5, where Ip is the initial pointer position (or 2D point in the 3D model view), Lp is the last pointer position corresponding to a point on the initial (or previous) texture island (i.e. the last 3D point correctly mapped to the 2D space), Cp is a current pointer position (or current 2D point in the 3D model view), and Id is the initial point in the 2D design document corresponding to the initial pointer position. The positions Cd, Ip, Lp, Cp, and Id may refer to points, where each point has a respective set of coordinates. Each of the sets of coordinates may include two values (e.g., an X axis value and a Y axis value). Equations 1-4 include decomposing (Cp-Ip) in Cproj (projection over a Lp-Ip line) plus Cperp. Equation 5 includes interpolating in 2D design document space to find the extended position (sometimes referred to as an extended map point).

$$p\text{Dir} = \text{normalize}(Lp\text{-}Ip) \qquad (1)$$

$$C\text{proj} = p\text{Dir} * \text{dotProduct}(p\text{Dir}, Cp\text{-}Ip) \qquad (2)$$

$$C\text{perp} = (Cp\text{-}Ip) - C\text{proj} \qquad (3)$$

$$C\text{perpSign} = \text{sign}(\text{dotProduct}(C\text{perp},\text{perpendicular}(p\text{Dir}))) \qquad (4)$$

$$Cd = Id + (Ld\text{-}Id) * (\text{normalize}(C\text{proj})/\text{normalize}(Lp\text{-}Ip)) + \text{perpendicular}(Ld\text{-}Id) * (\text{normalize}(C\text{perp}) * C\text{perpSign}/\text{normalize}(Lp\text{-}Ip)) \qquad (5)$$

At 568, the mapping module 458 positions, scales, and/or rotates the artwork/figure based on the calculated extended position. This may include moving a portion of the artwork/figure in the 3D space on the 3D model such that the artwork/figure wraps around a portion of the 3D model and/or is hidden. The hidden portion may be on a side of the 3D model opposite that in the camera view of the 3D model. The hidden portion may be seen by rotating the 3D model in the 3D window to provide a different camera view.

At 570, the 3D interaction module 122 determines whether another modification is to be performed. If another modification is to be performed task 550 may be performed, otherwise the method may end at 572. Task 420, 422 or 424 may be performed subsequent to task 570.

Movement of the artwork/file in the 3D space may be displayed in the 2D design document space. The artwork/file in the 3D space may be moved in a first direction and due to the arrangement of corresponding texture islands in the 2D design document may move in a different direction in the 2D design document space.

The above-described tasks of FIGS. 13 and 15 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Figure 16:
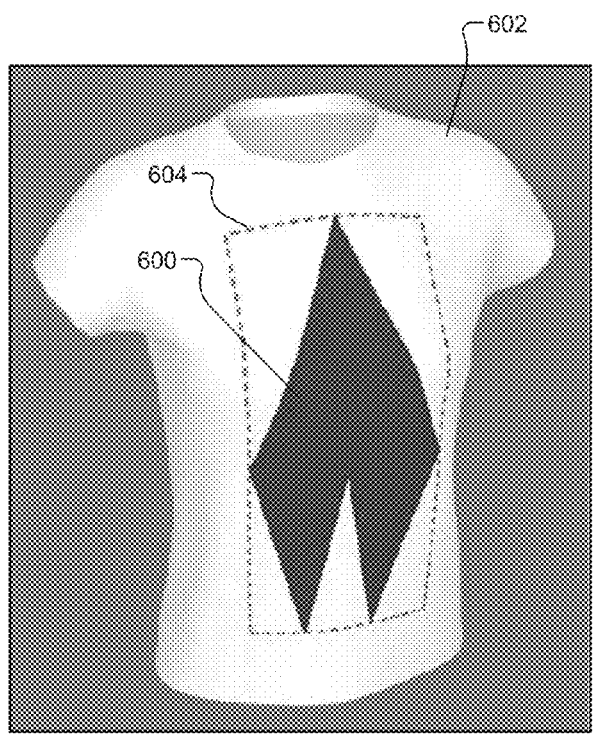
FIG. 16 is a view of a 3D model illustrating artwork that may be translated, scaled, and/or rotated on the 3D model in accordance with the present disclosure.
Figure 17:
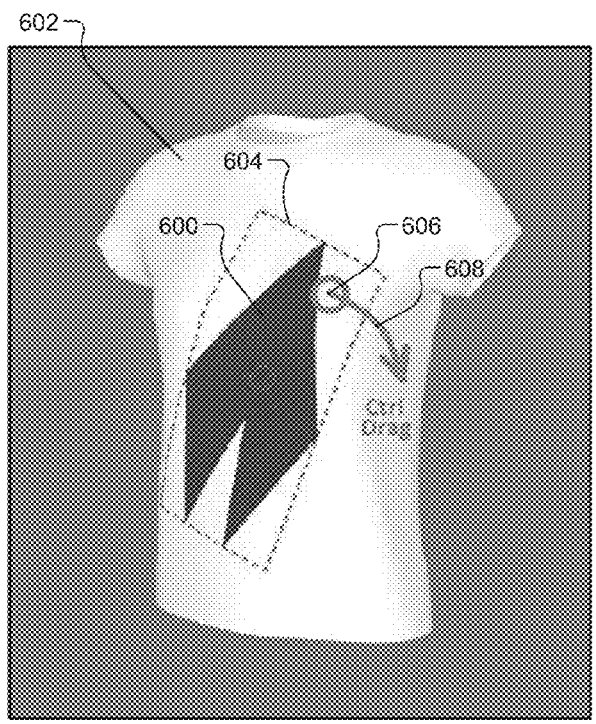
FIG. 17 is a view of the 3D model of FIG. 16 illustrating scaling and rotating of the artwork on the 3D model in accordance with the present disclosure.
Figure 18:
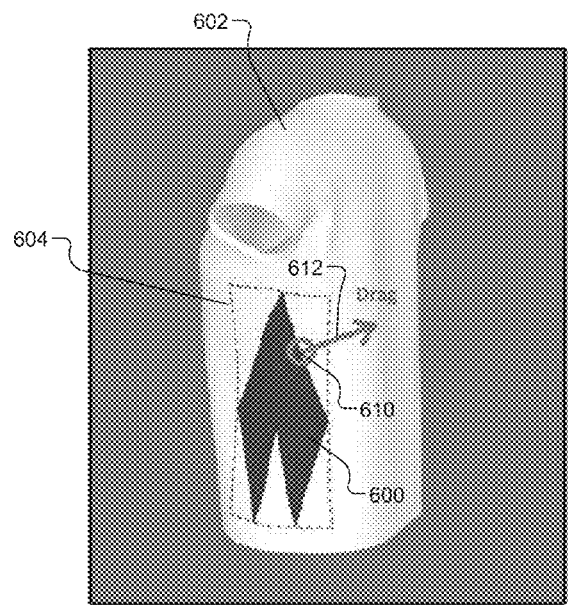
FIG. 18 is a view of the 3D model of FIG. 16 further illustrating translating of the artwork on the 3D model in accordance with the present disclosure.

Referring now to FIGS. 16-18, which show example rotation, scaling and translation of artwork/FIG. 600 on a 3D model 602, which may be performed by the modules of FIG. 2. FIG. 16 shows the artwork/FIG. 600 on the 3D model 602 and also shows a rectangular area 604, which may be an outline of the artwork/FIG. 600. The rectangular area 604 may be shown when a user moves a mouse pointer over and/or clicks on the rectangular area 604. The user may rotate and/or scale the rectangular area 604 by clicking on the rectangular area 604 and dragging and/or changing the size of the rectangular area 604. This is shown in FIG. 17. The clicked on point 606 and an arrow 608 are shown. The arrow 608 indicates a direction that the mouse was moved and the rectangular area 604 was rotated. FIG. 18 illustrates another movement of the artwork/FIG. 600. Another click on point 610 and an arrow 612 are shown. The arrow 612 indicates a direction that the mouse is to be moved and the rectangular area 604 is to be translated.

FIG. 19 shows windows 650, 652 having respectively a final aggregated texture image 654 and a 3D model 656. The final aggregated texture image 654 is shown with a portion of a mesh of white triangles 658 having a first portion of a front islands and a second portion on a sleeve island. The 3D model 656 is shown with a portion of a mesh of white triangles 660. The portions 658, 660 illustrate a portion of a UV map associated with the final aggregated texture image 654 and the 3D model 656.

The above disclosed techniques allow for full 360° wrapping of artwork on a 3D model in any direction while accounting for curvatures in a 3D model. This wrapping as shown above includes over the shoulder wrapping and full mid-section wrapping of a shirt. Multiple images on multiple versions of the same texture islands may be mapped from a 2D design space to a single 3D model of a final product.

The above disclosed techniques allow a user to interact with a 3D model and wrap artwork around and on a 3D model by clicking on the 3D model and moving a mouse pointer off of the 3D model. The further off of the 3D model the mouse pointer the further around the 3D model the artwork is moved.

The methods disclosed herein allow for defining 3D behavior when working solely in the 3D space. X and Y commands from the user interface due to movement of a mouse pointer in a 3D window can be mapped back to the 2D design space. This allows the user to work in the 3D space using 2D space commands. The user does not need to indicate a z-coordinate (or direction into the 3d camera view. The z-coordinate or z-order is defined by the 2D design document. The methods allow a normalized set of patterns that are used for manufacturing to be generated for production. As an example, normalized in the case of a short sleeve shirt, means to provide a set of patterns including a single front pattern, a single back pattern, a single right sleeve pattern, a single left sleeve pattern, and a single collar pattern.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A network device comprising:
    a document module configured to generate a 2D design document, wherein the 2D design document comprises a plurality of non-aggregated texture islands, wherein each of the plurality of non-aggregated texture islands corresponds to a pattern of a product being manufactured, and wherein the plurality of non-aggregated texture islands comprise at least two versions of one of the plurality of non-aggregated texture islands;
    a design module configured to add an artwork image across at least two of the plurality of non-aggregated texture islands;
    an aggregation module configured to (i) aggregate the at least two versions of the plurality of non-aggregated texture islands, and (ii) generate a final aggregated texture image based on the 2D design document, wherein the final aggregated texture image comprises a plurality of final aggregated texture islands, and wherein each of the plurality of final aggregated texture islands is distinctive from the other ones of the plurality of final aggregated texture islands; and
    a production texture module configured to generate a production texture based on the final aggregated texture image, wherein the production texture comprises a plurality of production islands, and wherein the plurality of production islands are scaled to match an actual size of a respective pattern to be transferred on fabric for the product.

2. The network device of claim 1, wherein the design module is configured to add the artwork image across each of the plurality of non-aggregated texture islands.

3. The network device of claim 1, further comprising:
    a UV mapping module configured to UV map the final aggregated texture image to generate a plurality of UV maps for the plurality of final aggregated texture islands, respectively, wherein outlines of the plurality of UV maps have similar shape as outlines of the plurality of final aggregated texture islands; and
    a 3D module configured to generate a 3D model based on the plurality of UV maps such that the artwork image or the final aggregated texture image wraps around at least a portion of the 3D model.

4. The network device of claim 3, wherein the 3D module is configured to wrap the artwork image or the final aggregated texture image 360° around a portion of the 3D model.

5. The network device of claim 1, further comprising:
    a pattern module configured to access a plurality of patterns for the product;
    a 3D module configured to generate a 3D model based on the plurality of patterns; and
    a UV mapping module configured to (i) generate a set of UV maps based on the 3D model, and (ii) update the set of UV maps based on the plurality of non-aggregated texture islands.

6. The network device of claim 1, further comprising:
    a user interface configured to receive a user input indicating coordinates on a 3D model of the product; and
    an unwrapping module configured to unwrap the 3D model based on the coordinates to generate a first UV map,
    wherein
        the plurality of non-aggregated texture islands are on a first page of the 2D design document,
        the document module is configured to add a second page to the 2D design document, and the second page includes a non-aggregated texture island representing the first UV map.

7. The network device of claim 6, wherein the UV map includes only a portion of the 3D model.

8. The network device of claim 6, wherein:
the unwrapping module configured to unwrap the 3D model based on the coordinates to generate a set of UV maps;
the set of UV maps includes the first UV map;
the second page includes a second plurality of non-aggregated texture islands corresponding to the UV maps in the set of UV maps; and
the second plurality of non-aggregated texture islands includes the non-aggregated texture island representing the first UV map.

9. The network device of claim 1, wherein:
the plurality of non-aggregated texture islands comprise a first non-aggregated texture island and second plurality of non-aggregated texture islands;
the 2D design document comprises a first page and a second page;
the first page comprises the first non-aggregated texture island; and
the second page comprises the second plurality of non-aggregated texture islands.

10. The network device of claim 9, further comprising:
a UV mapping module configured to map (i) the first non-aggregated texture island to a first UV map, and (ii) the second plurality of non-aggregated texture islands to a first plurality of UV maps; and
a 3D module, wherein the UV mapping module or the 3D module configured to map the first non-aggregated texture island and the second plurality of non-aggregated texture islands to a 3D model,
wherein
the UV mapping module configured to map the 3D model to a set of UV maps, and
the aggregation module configured to update the final aggregated texture image texture based on the set of UV maps.

11. The network device of claim 10, wherein each of the UV maps in the set of UV maps is distinctive from each of the other UV maps in the set of UV maps.

12. The network device of claim 1, wherein the at least two of the plurality of non-aggregated texture islands includes (i) a front island representing a front side of the product, and (ii) a back island representing a back side of the product.

13. The network device of claim 12, wherein the at least two of the plurality of non-aggregated texture islands includes a sleeve island representing a sleeve of the product.

14. The network device of claim 1, wherein a portion of the artwork is not on any of the plurality of non-aggregated texture islands.

15. The network device of claim 1, wherein the at least two versions of the one of the plurality of non-aggregated texture islands are the at least two of the plurality of non-aggregated texture islands.

16. The network device of claim 1, wherein a same portion of the artwork is applied over overlapping portions of the at least two of the plurality of non-aggregated texture islands.

17. The network device of claim 1, wherein the artwork is applied over an armpit area of the at least two of the plurality of non-aggregated texture islands.

18. The network device of claim 1, wherein:
the at least two of the plurality of non-aggregated texture islands comprise a front island and a back island; and
the document module is configured to orient the at least two of the plurality of non-aggregated texture islands such that the artwork extends over a shoulder area and at a first predetermined angle down the front island and at a second predetermined angle down the back island.

19. The network device of claim 1, wherein the document module is configured to clip the artwork along edges of viewable area of the at least two of the plurality of non-aggregated texture islands such that (i) a first portion of the artwork ends at a first seam line of a first texture island, and (ii) a second portion of the artwork begins at a second seam line of a second texture island.

20. The network device of claim 1, wherein the aggregation module is configured to aggregate the at least two versions of the plurality of non-aggregated texture islands to provide one of the plurality of final aggregated texture islands.

21. A method comprising:
generating a 2D design document, wherein the 2D design document comprises a plurality of non-aggregated texture islands, wherein each of the plurality of non-aggregated texture islands corresponds to a pattern of a product being manufactured, and wherein the plurality of non-aggregated texture islands comprise at least two versions of one of the plurality of non-aggregated texture islands;
adding an artwork image across at least two of the plurality of non-aggregated texture islands;
aggregating the at least two versions of the plurality of non-aggregated texture islands to generate a first final aggregated texture island;
generating a final aggregated texture image based on the 2D design document, wherein the final aggregated texture image comprises a plurality of final aggregated texture islands, wherein the plurality of final aggregated texture islands comprise the first final aggregated texture island, and wherein each of the plurality of final aggregated texture islands is distinctive from the other ones of the plurality of final aggregated texture islands; and
generating a production texture based on the final aggregated texture image, wherein the production texture comprises a plurality of production islands, and wherein the plurality of production islands are scaled to match an actual size of a respective pattern to be transferred on fabric for the product.

22. The method of claim 21, comprising adding the artwork image across each of the plurality of non-aggregated texture islands.

23. The method of claim 21, further comprising:
UV mapping the final aggregated texture image to generate a plurality of UV maps for the plurality of final aggregated texture islands, respectively, wherein outlines of the plurality of UV maps have similar shape as outlines of the plurality of final aggregated texture islands; and
generating a 3D model based on the plurality of UV maps such that the artwork or the final aggregated texture image wraps around a portion of the 3D model.

24. The method of claim 21, further comprising:
accessing a plurality of patterns for the product;
generating a 3D model based on the plurality of patterns;
generating a set of UV maps based on the 3D model; and updating the set of UV maps based on the plurality of non-aggregated texture islands.

25. The method of claim 21, further comprising:
receiving a user input indicating coordinates on a 3D model of the product;
unwrapping the 3D model based on the coordinates to generate a first UV map, wherein the plurality of non-aggregated texture islands are on a first page of the 2D design document; and
adding a second page to the 2D design document, wherein the second page includes a texture island representing the first UV map.

26. The method of claim 21, wherein:
the plurality of non-aggregated texture islands comprise a first non-aggregated texture island and second plurality of non-aggregated texture islands;
the 2D design document comprises a first page and a second page;
the first page comprises the first non-aggregated texture island; and
the second page comprises the second plurality of non-aggregated texture islands.

27. The method of claim 26, further comprising:
to mapping (i) the first non-aggregated texture island to a first UV map, and (ii) the second plurality of non-aggregated texture islands to a first plurality of UV maps;
mapping the first non-aggregated texture island and the second plurality of non-aggregated texture islands to a 3D model;
mapping the 3D model to a set of UV maps; and
updating the final aggregated texture image based on the set of UV maps.

28. The method of claim 21, further comprising:
receiving a 2D point referring to a current position of a pointer in a 3D window, wherein a 3D model is viewable in the 3D window;
converting the 2D point to a 3D point via ray casting;
determining whether an intersection exists for the 3D point with a face on the 3D model;
based on whether the intersection exists, inverse island transforming the 3D point to obtain a vertex in UV map coordinates;
determining whether the vertex is in an initial texture island of the 2D design document;
calculating an extended position based on at least two of (i) a last position of the pointer corresponding to a point on the initial texture island, (ii) an initial position of the pointer; and (iii) the current position of the pointer;
altering the initial texture island if the vertex is in the initial texture island; and
altering a second texture island based on the extended position if the vertex is not in the initial texture island.

29. A method comprising:
receiving a 2D point referring to a current position of a pointer in a 3D window, wherein a 3D model is viewable in the 3D window;
converting the 2D point to a 3D point via ray casting;
determining whether an intersection exists for the 3D point with a face on the 3D model;
based on whether the intersection exists, inverse island transforming the 3D point to obtain a vertex in UV map coordinates;
determining whether the vertex is in an initial texture island of a 2D design document;
calculating an extended position based on at least two of (i) a last position of the pointer corresponding to a point on the initial texture island, (ii) an initial position of the pointer; and (iii) the current position of the pointer;
altering the initial texture island if the vertex is in the initial texture island; and
altering a second texture island based on the extended position if the vertex is not in the initial texture island.

30. The method of claim 29, further comprising if vertex is not in the initial texture island:
saving the last position of the pointer prior to leaving the initial texture island; and
saving the initial position of the pointer.

31. The method of claim 29, wherein calculating the extended position comprises interpolation.

32. The method of claim 29, wherein the extended position is calculated based on an initial point in the 2D design document corresponding to the initial position of the pointer on the 3D model.

33. The method of claim 29, wherein the extended position is calculated based on a last point in the 2D design document corresponding to the last position of the pointer corresponding to a point on the initial texture island.

34. The method of claim 29, further comprising:
generate the 2D design document, wherein the 2D design document comprises a plurality of texture islands, wherein each of the plurality of texture islands corresponds to a pattern of a product being manufactured, and wherein the plurality of texture islands comprise at least two versions of one of the plurality of texture islands;
adding an artwork image across at least two of the plurality of texture islands;
aggregating the at least two versions of the plurality of texture islands to generate a first final aggregated texture island; and
generating a final aggregated texture image based on the 2D design document, wherein the final aggregated texture image comprises a plurality of final aggregated texture islands, wherein the plurality of final aggregated texture islands comprise the first final aggregated texture island, and wherein each of the plurality of final aggregated texture islands is distinctive from the other ones of the plurality of final aggregated texture islands.

* * * * *

UNITED STATES PATENT AND TRADEMARK OFFICE
CERTIFICATE OF CORRECTION

PATENT NO. : 9,596,899 B2
APPLICATION NO. : 14/733217
DATED : March 21, 2017
INVENTOR(S) : Brett Stahl et al.

It is certified that error appears in the above-identified patent and that said Letters Patent is hereby corrected as shown below:

On the Title Page

Item (60) should read:

Related U.S. Application Data
(60) Provisional application No. 62/009,713, filed on Jun. 9, 2014 --and Provisional application No. 62/045,933, filed on September 4, 2014--.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*